US012587039B2

(12) United States Patent
Audet et al.

(10) Patent No.: US 12,587,039 B2
(45) Date of Patent: Mar. 24, 2026

(54) WIRELESS CHARGING AND DOCKING STATION, SYSTEM AND ASSOCIATED METHOD

(71) Applicant: GPHY INC., Quebec (CA)

(72) Inventors: Hubert Audet, Quebec (CA); Anthony Blais, Quebec (CA); Pier-Etienne Lehoux, Montmagny (CA); Myrik Hervieux-Gaudreau, Saint-Raymond (CA)

(73) Assignee: GPHY INC., Quebec (CA)

( * ) Notice: Subject to any disclaimer, the term of this patent is extended or adjusted under 35 U.S.C. 154(b) by 627 days.

(21) Appl. No.: 18/005,935

(22) PCT Filed: Jul. 22, 2021

(86) PCT No.: PCT/CA2021/051022
§ 371 (c)(1),
(2) Date: Jan. 18, 2023

(87) PCT Pub. No.: WO2022/016285
PCT Pub. Date: Jan. 27, 2022

(65) Prior Publication Data
US 2023/0291243 A1 Sep. 14, 2023

Related U.S. Application Data

(60) Provisional application No. 63/056,161, filed on Jul. 24, 2020.

(51) Int. Cl.
*H02J 50/80* (2016.01)
*H02J 50/12* (2016.01)
*H02J 50/40* (2016.01)
(52) U.S. Cl.
CPC .............. *H02J 50/80* (2016.02); *H02J 50/12* (2016.02); *H02J 50/40* (2016.02)

(58) Field of Classification Search
CPC ............. H02J 50/80; H02J 50/12; H02J 50/40
See application file for complete search history.

(56) References Cited

U.S. PATENT DOCUMENTS

| | | | | |
|---|---|---|---|---|
| 6,184,651 | B1 * | 2/2001 | Fernandez | .............. H02J 50/80 320/108 |
| 2011/0057607 | A1 * | 3/2011 | Carobolante | ....... H02J 7/00034 320/108 |

(Continued)

FOREIGN PATENT DOCUMENTS

| | | | | |
|---|---|---|---|---|
| WO | WO-2009047769 A2 * | 4/2009 | .............. | G06F 1/26 |

OTHER PUBLICATIONS

International Search Report from parent PCT/CA2021/051022. Jan. 27, 2022.
Written Opinion from parent PCT/CA2021/051022. Jan. 27, 2022.

*Primary Examiner* — Hung Q Nguyen
(74) *Attorney, Agent, or Firm* — FisherBroyles, LLP; Craig W. Mueller

(57) ABSTRACT

A wireless power transfer and docking station and methods are provided for wirelessly charging or powering a portable device and automatically connecting to external peripheral devices. The station comprises at least one wireless-power transmitter for transmitting power and identification-related information, and at least one wireless-power receiver, connected to the portable device, for exchanging the power and the identification-related information to the portable device. The methods comprise pairing the at least one wireless-power transmitter with the at least one wireless-power receiver when the portable device is placed in a charging zone of the at least one wireless-power transmitter, exchanging the identification-related information for automatically and wirelessly connecting to the external peripheral devices, and attempting connecting to the external peripheral devices.

21 Claims, 12 Drawing Sheets

(56)             References Cited

U.S. PATENT DOCUMENTS

| | | | |
|---|---|---|---|
| 2015/0011160 A1 | 1/2015 | Jurgovan et al. | |
| 2015/0372496 A1 | 12/2015 | Lee et al. | |
| 2016/0285299 A1* | 9/2016 | Amand | .................. H02J 50/80 |
| 2017/0294797 A1 | 10/2017 | Meng et al. | |
| 2018/0074547 A1 | 3/2018 | Smadi et al. | |
| 2018/0307275 A1 | 10/2018 | Peil et al. | |
| 2020/0068060 A1 | 2/2020 | Ricci et al. | |

\* cited by examiner

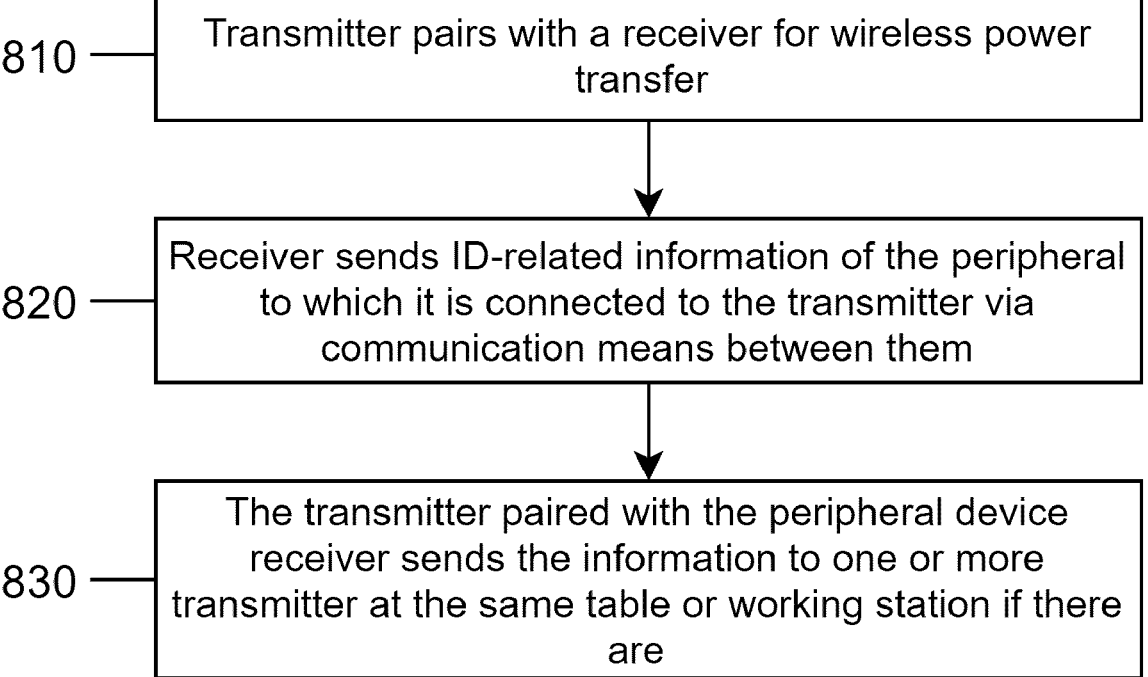

810 — Transmitter pairs with a receiver for wireless power transfer

820 — Receiver sends ID-related information of the peripheral to which it is connected to the transmitter via communication means between them 830 — The transmitter paired with the peripheral device receiver sends the information to one or more transmitter at the same table or working station if there are

*FIG. 8*

WIRELESS CHARGING AND DOCKING STATION, SYSTEM AND ASSOCIATED METHOD

This application is a national stage application under 35 U.S.C. 371 and claims the benefit of PCT Application No. PCT/CA2021/051022, having an international filing date of Jul. 22, 2021, which designated the United States, which PCT application claimed the benefit of U.S. Provisional Patent Application Ser. No. 63/056,161, filed Jul. 24, 2020, the entire disclosures of which are incorporated by reference herein.

TECHNICAL FIELD

The present invention generally relates to wireless charging systems, and more specifically to a wireless charging and docking station for wirelessly charging or powering electronic devices and establishing wireless connections with peripheral devices, allowing, for example, computers and laptops to automatically cast video images to display screens.

BACKGROUND

Charging of portable devices generally comprises having a power cable connecting the portable devices to a power source. Other methods also include wireless inductive charging, wherein a portable device generally must be laid on a charging device in order to initiate charging. The portable device generally must be equipped with integrated circuitry allowing it to be charged wirelessly.

Furthermore, interfacing portable devices with peripheral devices, such as additional monitors, projectors, and external speakers, generally requires physically connecting the portable devices to the peripheral devices using a variety of cables, depending on the capabilities of the portable devices and of the peripheral devices. The peripheral devices themselves generally need to be powered with power cables, further increasing the overall use of cables. Alternatively, the interfacing of portable devices with external peripheral devices can also be wireless. In this case, users must select the desired peripheral devices connections and the type of wireless connection. Cross-communication between the portable devices and other peripheral devices may occur in environments having a multitude of such portable and peripheral devices.

Consequently, there is a need for systems and methods allowing wireless charging and powering of electronic devices and automatic wireless connection between portable devices and peripheral devices in order to reduce the need for cables or manual intervention from users. Furthermore, there is a need for reducing unwanted cross-communications between wireless devices, especially in environments such as open-space working environments.

SUMMARY

According to an aspect, a wireless power transfer and docking station is provided, for wirelessly transferring power to a portable device and for communicating therewith the station comprises a wireless-power transmitter comprising a wireless power transmission module having a power-transmitting antenna configured for wirelessly emitting a power signal. The wireless-power transmitter further comprises a transmitter communication module for wirelessly exchanging identification-related information allowing the portable device to establish a wireless connection with one or more peripheral devices associated with the wireless-power transmitter, and a transmitter-controller for controlling at least one of the wireless power transmission module and the transmitter communication module. The station further comprises a wireless-power receiver comprising a wireless power receiving module having a power-receiving antenna for receiving the power signal emitted from the wireless power transmission module and transferring the power from the power signal to the portable device. The wireless-power receiver further comprises a receiver communication module for receiving the identification-related information from the transmitter communication module, and a receiver-controller for controlling at least one of the wireless power receiving module and the receiver communication module, the receiver-controller being further configured to communicate the identification-related information to the portable device.

In possible implementations, the station is configured to pair the wireless-power transmitter with the wireless-power receiver to avoid cross-connection with adjacent wireless-power transmitters and cross-communication with adjacent peripheral devices. The wireless-power transmitter is configured to send one or more power beacons, and the wireless-power receiver is configured to broadcast advertisement signals in response to said one or more power beacons to pair the wireless-power transmitter with the wireless-power receiver.

In possible implementations, the station further comprises a software application module executed or accessed by the portable device and configured to perform automatic wireless connection between the portable device and the one or more peripheral devices based at least in part on the identification-related information.

In possible implementations, the software application module is further configured to perform the automatic wireless connection between the portable device and the one or more peripheral devices based on user preferences. The user preferences comprise at least allowed peripheral device types and automatic connection permissions.

In possible implementations, the software application module is further configured to automatically disconnect the portable device from the one or more peripheral devices in reaction to any one of disconnection events. The disconnection events include at least the wireless-power receiver leaving a charging zone of the wireless-power transmitter, the wireless-power receiver leaving the charging for a period of time, and a connection strength between the portable device and the one or more peripheral devices lowering below a strength threshold.

In possible implementations, the station further comprises a database storing additional information comprising at least one of wireless-power transmitter information, position information, and peripheral device information. The software application module is further configured to retrieve the additional information before automatically connecting the portable device to the one or more peripheral devices.

In possible implementations, the software application module is further configured to automatically update the database in response to any one of interactions between at least two of the wireless-power transmitter, the wireless-power receiver, the portable device, and the one or more peripheral devices. The interactions include at least automatic connection attempts, successful connections, exchanging of the identification-related information, and manual user interactions.

In possible implementations, the software application module is further configured to automatically update the database when a mismatch is detected between the additional information of the database and actual availability of at least the wireless-power transmitter and the one or more peripheral devices.

In possible implementations, the power signal is modulated for transmitting the identification-related information.

In possible implementations, the wireless-power receiver is removably connected to the portable device using a power connector for transmitting the power to the portable device and a communication connector for exchanging the identification-related information with the portable device.

In possible implementations, the wireless-power receiver is removably connected to the portable device using a single connector for transferring the power to the portable device and for exchanging the identification-related information with the portable device.

In possible implementations, the wireless-power receiver is integrated into the portable device using internal electronic circuits.

In possible implementations, emission and reception of the power signal is performed using one of inductive coupling and resonant inductive coupling.

In possible implementations, the software application module is further configured to automatically cast digital information from the portable device to a wireless monitor, when the portable device is automatically connected to the wireless monitor.

In possible implementations, the wireless-power transmitter is a first wireless-power transmitter, and the wireless-power receiver is a first wireless-power receiver. The station further comprises a second wireless-power transmitter, and a second wireless-power receiver operatively connected to the one or more peripheral devices. The second wireless-power transmitter is wirelessly connected to the second wireless-power receiver, and the identification-related information is exchanged between the second wireless-power receiver, the second wireless-power transmitter, the first wireless-power transmitter, and the first wireless-power receiver, allowing for automatically connecting the portable device to the one or more peripheral device.

In possible implementations, the first and second wireless-power transmitters are connected together using a wired connection.

In possible implementations, the wireless-power receiver is a first wireless-power receiver. The station further comprises an additional wireless-power receiver operatively connected to the one or more peripheral devices. The wireless-power transmitter is simultaneously connected to the first wireless-power receiver and to the additional wireless-power receiver, thereby powering the portable device and the one or more peripheral devices.

In possible implementations, the wireless-power transmitter further comprises a power connector removably connected to a power source, for receiving an input power signal from the power source, and an input power conversion module comprising power-conditioning circuitry for converting the input power signal into the power signal. The wireless-power receiver further comprises an output power conversion module, comprising power-conditioning circuitry for converting the power signal into a device-compatible power signal, the power transferred to the portable device being the device-compatible power signal. The transmitter-controller is further configured for controlling the input power conversion module. The receiver-controller is further configured for controlling the output conversion module.

In possible implementations, the software application module comprises a user interface allowing users to create or update user preferences, manually update the database, manually connect the portable device to one or more of the peripheral device(s), confirm a connection between the portable device and a peripheral device, and disconnect the peripheral device from the portable device.

According to a second aspect, a wireless power transfer and docking station is provided, for wirelessly transferring power to a portable device and communicating therewith. The station comprises a wireless-power transmitter comprising a wireless power transmission module configured to generate an alternating field to wirelessly transfer the power to the portable device located within a charging zone of the wireless-power transmitter, and a wireless communication module for transferring identification-related information allowing the portable device to establish a wireless connection with one or more peripheral devices, the one or more peripheral devices being external from both the wireless-power transmitter and the portable device.

In possible implementations, the wireless power transmission module comprises a power-transmitting antenna to generate the alternating field, the alternating field being a magnetic oscillating field.

In possible implementations, the wireless power transmission module further comprises an input power conversion module including a power connector for receiving an input power signal from a power source, and power-conditioning circuitry to at least one of regulate, condition and amplify the input power signal into a power signal prior to being directed to the power antenna.

In possible implementations, the wireless communication module comprises an emitting communication antenna, distinct from the power antenna, adapted to send wireless signals to at least one of Wi-Fi, Bluetooth and Bluetooth Low Energy (BLE) standards.

In possible implementations, the wireless-power transmitter further comprises a transmitter-controller configured to control operating functions of the wireless-power transmitter, the operating functions comprising at least one of acquiring measurements related to the wireless-power transmitter, controlling the input power conversion module and controlling the transmitter wireless communication module.

In possible implementations, the transmitter-controller comprises a storage medium for storing the identification-related information, the identification-related information comprising at least one of a wireless-power transmitter identification, a docking station identification, and a peripheral device identification.

In possible implementations, the wireless power transmission module and the wireless communication module form a single module, the power-transmitting antenna being adapted to send the identification-related information through signal modulation.

In possible implementations, the wireless communication module is further configured to exchange monitoring data with the portable device for at least one of regulating power transfer, regulating power transfer efficiency, and regulating rectified voltage.

In possible implementations, the one or more peripheral devices comprise at least one of a monitor, a display screen, a projector, a television, a keyboard, a mouse, a speaker, and an audio system, all provided with wireless connectivity.

In possible implementations, the station further comprises a software application module executed or accessed by the portable device and configured to perform automatic wireless connection between the portable device and the one or more peripheral devices based at least in part on the identification-related information.

In possible implementations, the station further comprises a database storing additional information comprising at least one of wireless-power transmitter information, position information, and peripheral device information. The software application module is further configured to retrieve the additional information before automatically connecting the portable device to the one or more peripheral devices.

In possible implementations, the software application module is further configured to automatically update the database in response to any one of interactions between at least two of the wireless-power transmitter, the portable device, and the one or more peripheral devices. The interactions include at least automatic connection attempts, successful connections, exchanging of the identification-related information, and manual user interactions.

According to a third aspect, a method is provided for wirelessly transferring power to a portable device and for communicating therewith, allowing the portable device to wirelessly connect with one or more peripheral devices. The method comprises the steps wirelessly pairing a wireless-power transmitter with a wireless-power receiver, the wireless-power receiver being built-in or connectable to the portable device, wirelessly transferring power from the wireless-power transmitter to the wireless-power receiver, for charging the portable device, and wirelessly transferring identification-related information allowing the portable device to establish a wireless connection with the one or more peripheral devices.

In possible implementations, the step of wirelessly pairing the wireless-power transmitter with the wireless-power receiver comprises sending, from the wireless-power transmitter, power beacons to the wireless-power receiver, thereby activating the wireless-power receiver, broadcasting, by the wireless-power receiver, an advertisement signal, and analyzing, by the wireless-power transmitter, the advertisement signal received, and determining that the advertisement signal corresponds to the wireless-power receiver.

In possible implementations, prior to determining that the advertisement signal corresponds to the wireless-power receiver, the method comprises a step of determining that any one of additional criteria are valid, the additional criteria comprising at least a timing criterion, an impedance criterion and physical characteristic data related to power and information transfer.

In possible implementations, the method further comprises a step of automatically attempting wirelessly connecting the portable device with the one or more peripheral devices based at least in part on the identification-related information.

In possible implementations, the method further comprises monitoring steps for validating that the step of wirelessly pairing the wireless-power transmitter with the wireless-power receiver is successful. The monitoring steps comprise at least one of varying electric characteristics of the wireless-power transmitter and monitoring corresponding variation of electric characteristics of the wireless-power receiver, and comparing the power sent by the wireless-power transmitter and the power received by the wireless-power receiver.

In possible implementations, wirelessly sending the identification-related information comprises establishing a wireless communication channel between the wireless-power transmitter and the wireless-power receiver, sending the identification-related information from the wireless-power transmitter to the wireless-power receiver, sending the identification-related information from the wireless-power receiver device to the portable device, and identifying the one or more peripheral devices associated with the wireless-power transmitter based at least in part on the identification-related information.

In possible implementations, the method further comprises a step of performing, a software application module executed or accessed by the portable device, automatic wireless connection between the portable device and the one or more peripheral devices based at least in part on the identification-related information.

In possible implementations, the method further comprises a step of communicating with a database configured for storing additional information necessary for identifying the one or more peripheral devices based on the identification-related information and for connecting with the one or more peripheral devices associated with the wireless-power transmitter.

In possible implementations, the method further comprises a step of notifying a user when an attempt at establishing a wireless connection between the portable device and at least one of the one or more peripheral devices fails.

In possible implementations, the step of automatically attempting wirelessly connecting the portable device with the one or more peripheral devices is further based on the additional information stored in the database.

In possible implementations, the method further comprises at least one of creating or modifying user preferences comprising at least allowed peripheral device types and automatic connection permissions, updating the database to at least one of create, update and delete associations between the wireless-power transmitter and the one or more peripheral devices, manually connecting the portable device to at least one of the one or more peripheral devices, and manually disconnecting the portable device from the at least one of the one or more peripheral devices.

In possible implementations, the step of automatically attempting wirelessly connecting the portable device with the one or more peripheral devices is further based on the user preferences.

In possible implementations, the method further comprises a step of automatically updating the database in response to any one of interactions between at least two of the wireless-power transmitter, the wireless-power receiver, the portable device, and the one or more peripheral devices. The interactions include at least automatic connection attempts, successful connections, exchanging of the identification-related information, and manual user interactions.

In possible implementations, the method further comprises wirelessly connecting an additional wireless-power receiver with the wireless-power transmitter, allowing for charging and communicating simultaneously with two wireless-power receivers.

In possible implementations, the method further comprises a step of automatically disconnecting the portable device from the one or more peripheral devices in reaction to any one of disconnection events. The disconnection events include at least the wireless-power receiver leaving a charging zone of the wireless-power transmitter, the wireless-power receiver leaving the charging for a period of time, and a connection strength between the portable device and the one or more peripheral devices lowering below a strength threshold In a possible implementation of the method, the portable device is configured to automatically attempt connecting to one or more of the peripheral devices associated with the identification-related information received from the wireless-power transmitter, for example to cast digital information from the portable device to a wireless monitor.

According to another aspect, a plurality of workstations is provided, the workstations each comprising a wireless power transfer and docking system or station according to one of the aspects hereinabove. The database is used to manage all the peripheral devices, wireless-power transmitters and wireless-power receivers included with the plurality of workstations.

Other features and advantages of the embodiments of the present invention will be better understood upon reading of preferred embodiments thereof with reference to the appended drawings. The station, system and method presented herein is particularly adapted to a multi-workstation environment by advantageously limiting potential cross-connections and cross-communications and limiting the number of wires and manual interventions, such as manual connections, needed.

BRIEF DESCRIPTION OF THE DRAWINGS

FIG. 8 is another flow chart of possible steps of a wireless charging method, according to another possible implementation, wherein a wireless-power receiver module is integrated into a peripheral device.

Figure 1:
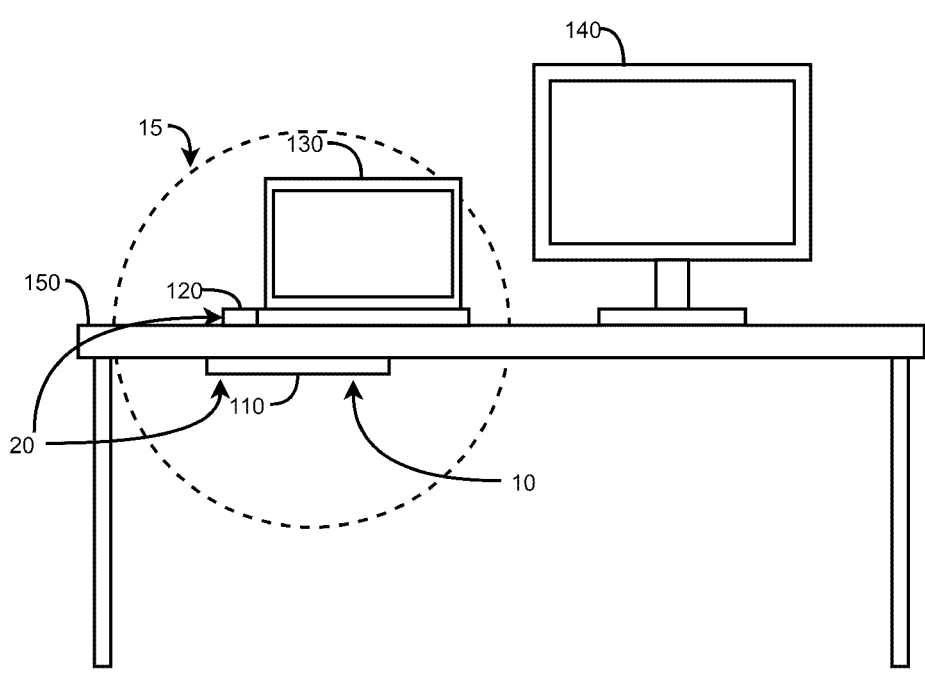
FIG. 1 is a schematic illustration of the wireless power transfer and docking station according to a possible embodiment.

It should be noted that the appended drawings illustrate only exemplary embodiments of the invention and are therefore not to be construed as limiting of its scope, for the invention may admit to other equally effective embodiments.

DETAILED DESCRIPTION

In the following description, similar features in the drawings have been given similar reference numerals and to not unduly encumber the drawings, some elements may not be indicated in some figures if they were already introduced in a preceding figure. It should be understood that the elements of the drawings are not necessarily depicted to scale, since emphasis is placed on illustrating the elements and the interactions between elements.

The wireless power transfer and docking station, method and software application described in the present application relate to power and communication management and optimization. The exemplary systems and configurations illustrated in FIGS. 1 to 12 are especially adapted for wireless working environments where users bring in their own processing devices, such as laptops and smart tablets, and need to charge or power their processing devices and connect them to external peripheral devices, such as wireless displays or speakers, provided in the working environment. That said, the proposed charging station, method can be adapted to and used in different environments, such as classrooms, public libraries and coffee shops, as examples only.

Regarding wireless connectivity, existing systems typically require users to interact or configure their processing device in order to initiate the connection between their own device and external devices, such as monitors or display screens. The initial handshake for establishing a wireless connection between the portable and peripheral devices are prone to unwanted cross-communications, such as with devices other than those located at a specific workstation, or table. Cross-communications can be avoided with the use of cables, but cables require that the user plug and unplug the cables, which may rapidly become cumbersome and time consuming if multiple peripheral devices are to be connected. Further, manually selecting devices for wireless connection can also be time consuming, especially in environments comprising a multitude of workstations and peripheral devices. As for wireless charging, existing systems often comprise a charging device with a plate or surface on which the device to be charged must be laid on, further encumbering the available working space.

According to an aspect of the present application, a wireless power transfer and docking station is provided, comprising at least a wireless-power transmitter. When integrated in a workstation, as an example only, the station can provide powering and charging capacities to several devices, as well as automatic wireless connection between these devices. The proposed station and method advantageously reduce the number of cables typically needed for such arrangements and facilitate the connection process from a portable device to one or more peripheral devices. In a typical implementation of the system, a user can start casting or streaming video signal from his portable device to a wireless monitor by simply placing his device in the charging zone of a wireless-power transmitter comprised in the wireless power transfer and docking station.

Further, the method described allows for connecting a portable device entering a charging zone of a workstation to associated peripheral devices having wireless communication capabilities. Using a database allows to use this method in a multi-docking-station environment such as offices and working environment. In such environments, if all peripheral devices use wireless communication means, manual connection can become rapidly cumbersome since a lot of peripheral devices broadcasting their presence are received by a given portable device and choosing the correct peripheral devices may become complex.

Broadly described, the proposed docking station comprises at least a wireless-power transmitter, which includes a power transmission module, and a wireless communication module. The docking station further comprises a corresponding wireless-power receiver, with power receiving and communication modules. The wireless-power receiver can be externally connected to, or alternatively integrated in, a portable device. In either case, the wireless-power receiver is operationally connected to the portable device. The proposed wireless power transfer and docking station thus allows to wirelessly charge or power the portable device by pairing the wireless-power receiver connected to the portable device with the wireless-power transmitter.

Once the pairing is established, identification information related to the wireless-power transmitter, to the docking station, and/or optionally to peripheral devices can be exchanged between the wireless-power transmitter and the wireless-power receiver. This process provides an advantage of reducing the possibility of unwanted cross-communications, since the pairing between the wireless-power transmitter and the wireless-power receiver limits the exchange of information between intended targets only. One of the advantages of the present application is that it allows for creating and managing multiple workstations having a docking station installed, such as in a context of open offices, efficiently reducing unwanted cross-communication between neighboring portable devices and peripheral devices, as may occur when trying to manually connect wirelessly to peripheral devices, and further simplifying the process of connecting a portable device to peripheral devices associated to a particular workstation. The multitude of peripheral devices, docking stations, or workstations can also be managed remotely using the database. Further, the present application can advantageously improve the cybersecurity of the working environment since it reduces the need to broadcast the presence of a portable device or a peripheral device, and the portable devices can connect to peripheral devices without being on a particular network. Further, there is no need for connecting the docking stations to a wireless network for exchanging information or performing updates, for example.

The pairing between the wireless-power transmitter and the wireless-power receiver allows for a wireless communication channel to be established. By using the wireless communication channel between the wireless-power transmitter and the wireless-power receiver, and a wired connection between the wireless-power receiver and the portable device, the docking station ensures that the portable device receives identification-related information indicating which wireless-power transmitter the wireless-power receiver is associated with, and in some embodiments, which table or workstation it is associated with in a multi-workstation environment, for example. The portable device may then automatically attempt to wirelessly connect to peripheral devices associated to the workstation and limit cross-communication to peripheral devices elsewhere.

In some embodiments, a software application module may be installed on the portable device or can be accessed as a web-based application, for example when the software application module is installed on a local server, a distant server or a cloud server. The software application can connect to a database to retrieve additional information relating to the wireless docking station, the wireless-power transmitter, the portable device and/or the peripheral devices, based on the identification-related information exchanged between the wireless-power transmitter and the wireless-power receiver. The additional information may comprise, for example, wireless-power transmitter information identifying the wireless-power transmitter, position information identifying a physical location of the wireless-power transmitter or the docking station and associated peripheral devices, and peripheral information identifying each peripheral device, and may be used by the software application module to attempt connecting the portable device with the peripheral devices associated to the wireless-power transmitter, or to additional wireless-power transmitters or receivers.

In the present application, the term "portable device" refers to any type of portable processing device such as, without being limited to, portable computers, laptops, smart tablets, notebooks, smart phones and two-in-one laptops.

By "power-conditioning circuitry," we refer to electric and/or electronic circuits capable of functions such as regulating, amplifying and modifying a power signal, at any frequency, and matching its impedance to another signal.

By "identification-related information", we refer to any information that may be used to identify a transmitter, a peripheral device, a docking station, and any relevant device. The identification-related information may be an identification (ID), or data which can be used to retrieve an identification in a database, for example. An identification-related information may have a string format, for example, and may include numeric, hexadecimal or ASCII characters.

By "peripheral device", we refer to any device that may be connected to or interfaced with a portable device. Such a peripheral device may be, without being limited to, a display monitor, a computer monitor, a projector, any screen device, a television, a wireless mouse, a speaker, an audio system, and a wireless keyboard. In the context of the present description, the "peripheral devices" are wireless devices. Some peripheral devices are built without wireless capabilities. In such cases, external dongles may be connected to those peripheral devices to provide them with wireless communication capabilities needed to establish a wireless connection with a portable device. Those external dongles may be considered the "peripheral device" instead of the actual peripheral device in some embodiments.

By "power signal", we refer to any flow of electrical energy through a wireless power transfer and docking station from a power connector to any device being charged or powered by the station. The terms "input power signal", "converted power signal", and "device-compatible power signal" may refer to a flow of electrical energy that may or may not contain information, in the form of signal modulation for example. The term "input power signal" may be replaced by "input DC power" or other synonyms. The term "converted power signal" may be replaced by "RF power" or other appropriate synonyms. The term "device-compatible power signal" may be replaced by "device-compatible output DC power", or simply "power", or other synonyms.

By "advertisement signal", we refer to any type of message, signal or information that can be sent by a wireless-power receiver to confirm its presence. The advertisement signal can be general, such as simply enabling the acknowledgement of the presence of any wireless-power receiver. Alternatively, the advertisement signal could be specific, containing identification information of a particular wireless-power receiver, for example.

Referring now to FIG. 1, a possible embodiment of a wireless power transfer and docking station 10 is illustrated. Further, a wireless power transfer and docking station, comprising the docking station 10 and a wireless-power receiver 120 is shown. The docking station 10 comprises a wireless-power transmitter 110 having a charging zone 15. A portable device 130, connected to a wireless-power receiver 120 is located in a charging zone 15 and being charged by the wireless-power transmitter 110. A peripheral device 140, such as a computer monitor, is located on a table, or workstation 150, on which the docking station 10 is installed. The wireless-power transmitter 110 wirelessly transfers a power signal to the wireless-power receiver 120, which transfers power to the portable device 130 for charging or powering it. The wireless-power transmitter 110 is connected to a power source (not shown) which provides an input power signal to the wireless-power transmitter 110, allowing the wireless-power transmitter to generate an alternating field, such as a magnetic field oscillating at a given frequency. The alternating field allows the wireless-power transmitter 110 to transfer the power signal to the wireless-power receiver 120.

The wireless-power transmitter 110 and the wireless-power receiver 120 further exchange identification-related information using communication means, the identification-related information being sent to the portable device 130 by the wireless-power receiver 120. The identification-related information may allow the portable device 130 to automatically connect to the peripheral device 140. Although in FIG. 1 only one peripheral device 140 is shown, in alternative setups, a plurality of external peripheral devices may be located on the workstation 150, and the portable device 130 may attempt to connect to the plurality of peripheral devices. The identification-related information exchanged between the transmitter 110 and the receiver 120 when initiating communications may allow the portable device 130 to automatically identify, and connect to, the external peripheral device 140 located at the workstation 150. The portable device 130 can attempt to automatically connect to the peripheral device 140 with wireless communication means, with or without the need for user authorization. When the connection is successful, the portable device 130 may then exchange data with the external peripheral device 140 through an established wireless communication means. Such data may be used for casting, mirroring, or streaming video and/or sound signals from the portable device 130 to the peripheral device 140, as examples only. Wireless communication means between the portable device 130 and the peripheral device 140 may include, but are not limited to, wireless HDMI communications, Wi-Fi, Bluetooth, broadband cellular network and any other communication means supported by the portable device and the peripheral devices. The peripheral device 140 may also be connected to an external dongle providing wireless communications means not integrated.

The wireless-power transmitter 110 described herein is positioned under the workstation 150. However, in alternative embodiments, the wireless-power transmitter 110 may be positioned on top of the workstation, or integrated to the workstation, for example. The wireless-power receiver 120 of FIG. 1 is configured as an external dongle, connected to one or more ports of the portable device 130. However, in other embodiments, the wireless-power receiver 130 can be integrated to the portable device, or further directly integrated to the main board of the portable device 130.

Still referring to FIG. 1, when the portable device 130, connected to the wireless-power receiver 120, is placed on the workstation 150 in the charging zone 15, a pairing process between the wireless-power transmitter 110 and the wireless-power receiver 120 is started. The pairing process may comprise one or more pairing methods used for limiting potential cross-connections between unintended wireless-power transmitters and receivers, such as in an environment comprising a multitude of workstations 150. Once the pairing process is completed, the portable device 130 may be charged or powered by the wireless-power transmitter 110 via the wireless-power receiver 120, and may additionally receive the identification-related information exchanged between the wireless-power transmitter 110 and wireless-power receiver 120. In preferred embodiments, the wireless-power transmitter 110 and the wireless-power receiver 120 may further exchange data other than identification-related information using the wireless communication channel, such as monitoring data for regulating the power transferred, the transfer efficiency, and the rectified voltage, for example. The wireless-power transmitter 110 and the wireless-power receiver 120 may also use different technologies for exchanging power, such as inductive coupling, resonant inductive coupling, any implementation related to these technologies, and any technology using fields.

Figure 2:
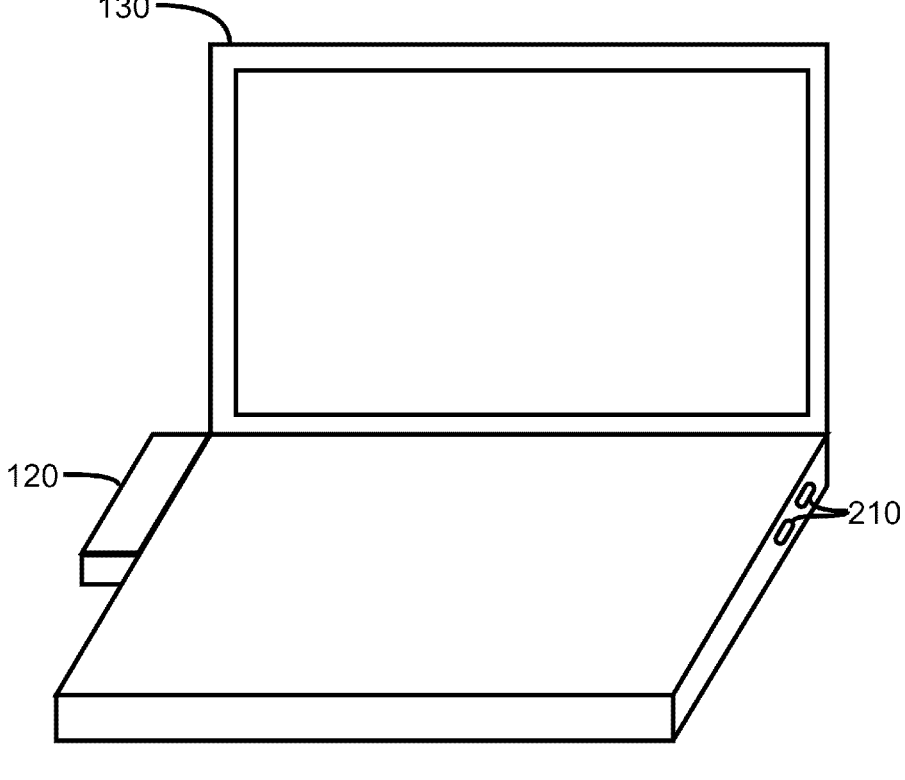
FIG. 2 is a schematic diagram of a portable processing device provided with a wireless power receiving module, according to a possible embodiment.

Referring now to FIG. 2, the portable device 130 is shown being charged and/or powered by the external wireless-power receiver 120. The wireless-power receiver 120 may have different dimensions and appearances and the drawing is only a conceptual representation. The wireless-power receiver 120 may be plugged in one or more external connectors 210 to allow the transfer of power and identification-related information to the portable device 130. External connectors 210 may include, without being limited to, USB Type-C connectors, other USB connectors, barrel connectors and other standard ports well known in the art. In some embodiments, the wireless-power receiver 120 may have only one connector (not shown) for power transmission and data transmission to the portable device 130. Alternatively, the wireless-power receiver 120 may have two external connectors, one connector being used for power transmission and the other connector for data transmission to the portable device 130.

In embodiments where the receiver is integrated inside the portable device 130, no external connectors are needed. The power and data transmission may be directly carried by appropriate circuitry of the portable device 130 circuitry.

Figure 3:
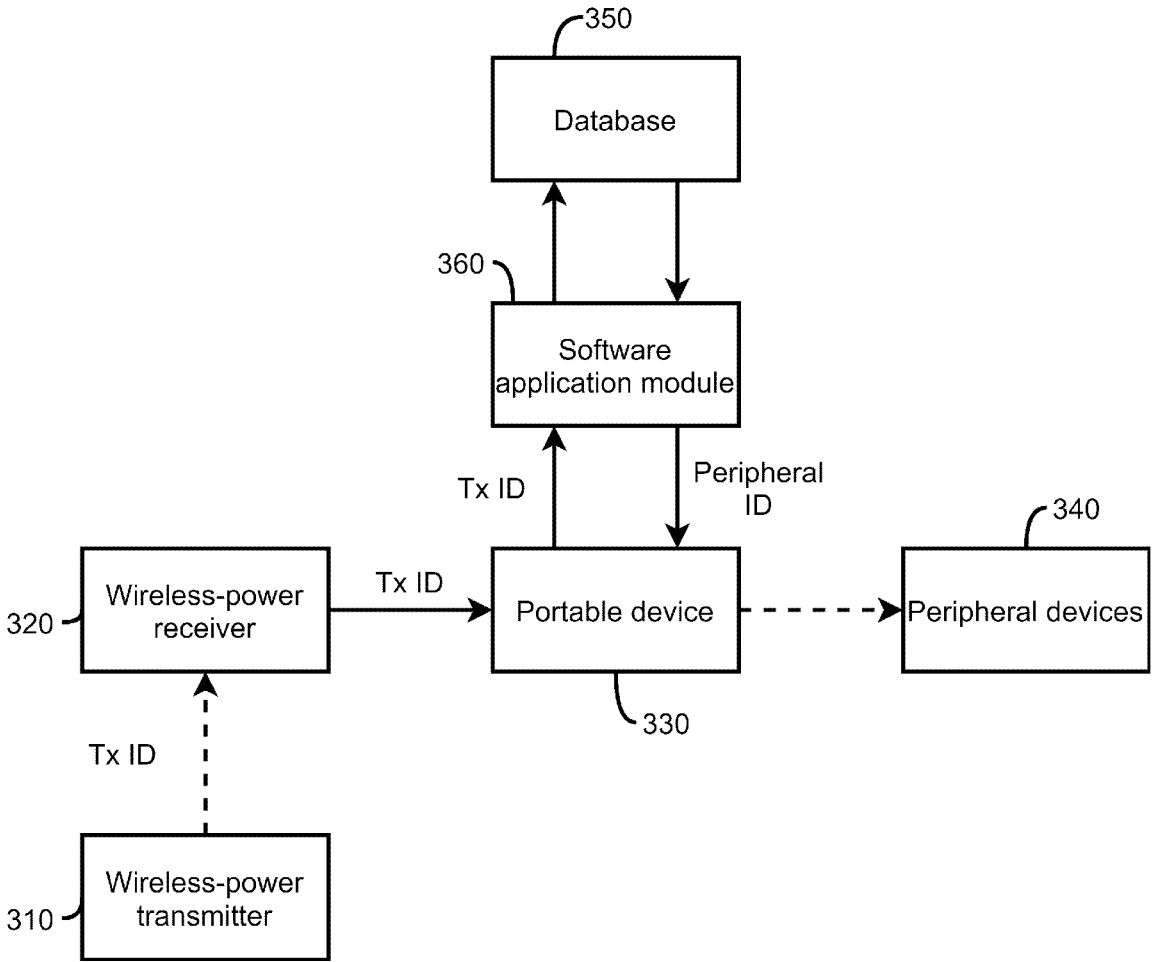
FIG. 3 is functional block diagram of a wireless power transfer and docking station according to a possible embodiment.

FIG. 3 shows a possible flow of information through the different components of the station or system, allowing the portable device 330 to automatically and wirelessly connect to peripheral devices 340 through a software application module 360, and removing the need for these peripheral devices to have a wired connection to the wireless-power transmitter 310 or other components of the station.

Before the flow of information may start, a pairing process between the wireless-power transmitter 310 and the wireless-power receiver 320 is performed. The pairing process allows for ensuring that the wireless-power transmitter properly connects with a wireless-power receiver 320 located in the charging zone of the transmitter, and advantageously limits possible cross-connection, which provides an advantage of sending an appropriate identification-related information to the portable device and thus limiting cross-communication between the portable device and unintended peripheral devices, such as peripheral devices located on other working stations or tables. Otherwise, cross-connection may be particularly problematic in an environment having multiple workstations each having a docking station installed, such as in open-space offices. Depending on the embodiments, various pairing methods may be performed.

Figure 4:
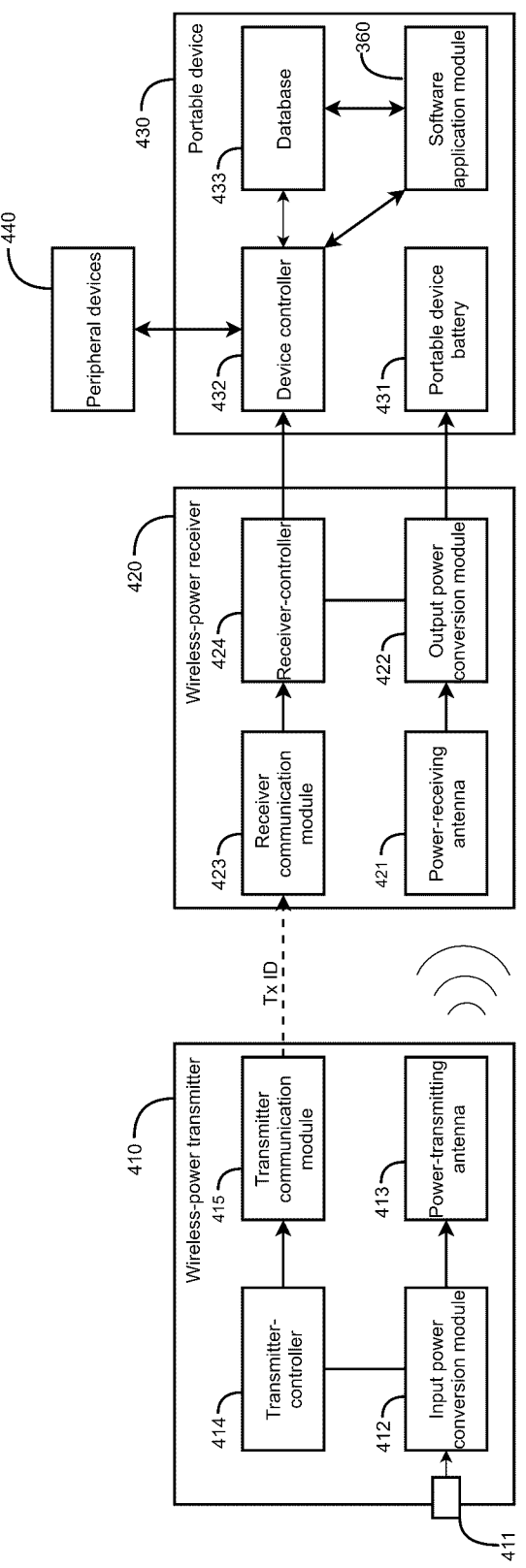
FIG. 4 is another more detailed functional block diagram of a wireless power transfer and docking station, according to a possible embodiment.

One pairing method comprises having the wireless-power transmitter 130 emit power during short periods of time, those emissions also called power beacons, providing enough power and time for the wireless-power receiver 320 to boot and broadcast an advertisement signal using a receiver communication module (424 in FIG. 4). When the wireless-power transmitter 310 receives the advertisement signal from the wireless-power receiver 320, and if additional criteria for limiting cross-connection are respected, the wireless-power transmitter may begin emitting more power to start the exchange of static and dynamic parameters between the wireless-power transmitter 310 and the wireless-power receiver 320. For example, the static parameters can include maximum power that can be received by the wireless-power receiver and identification of the company associated to the workstation or wireless-power transmitter. Dynamic parameters can include current DC voltage and current, and ideal DC voltage and current. Further, the static and dynamic parameters can be defined by a standard adopted for the communication channel, such as Airfuel Alliance. For example, the static parameters can further include wireless-power receiver category and wireless-power transmitter class.

In some embodiments, once the wireless-power transmitter receives the advertisement signal, it starts transmitting more or continuous power to the wireless-power receiver. However, before the wireless-power receiver starts transferring the power to the portable device, the static and dynamic parameters may be exchanged between the wireless-power transmitter and the wireless-power receiver.

One of the additional criteria is a timing criterion. A timing, or timestamp, of reception of the advertisement signal from a wireless-power receiver 320 by the wireless-power transmitter 310 is analyzed. If the timing does not match an emission of a beacon by the wireless-power transmitter 310, or if the timing corresponds to a moment when no power is emitted, the criterion may be invalid, preventing the pairing, as the mismatch in timing may be indicative that the advertisement signal was sent by an unintended wireless-power receiver. Conversely, the criterion is valid when the timing matches sending a beacon by the wireless-power transmitter 310.

However, this criterion alone may not be sufficient to limit cross-connections in a context of a docking stations powering more than one device. For example, when receiving an advertisement signal from a second device trying to pair with the wireless-power transmitter of the docking station, the wireless-power transmitter 310 may already be transferring power in the charging zone to power a first device. Therefore, the timing criterion may be wrongly considered valid if advertisement signal from an unintended wireless-power receiver is received while the wireless-power transmitter 310 is transferring power to the first device. Accordingly, an impedance criterion may additionally be used during the pairing process to further limit possible cross-connections. The impedance criterion comprises comparing impedances in the wireless-power transmitter. An impedance at the power-transmitting antenna is measured before a new wireless-power receiver enters the charging zone. Such measurements can be made periodically or continuously, according to various embodiments. When the wireless-power receiver and portable device enter the charging zone, a change in the measured impedance may be detected, indicated that a wireless-power receiver indeed entered the charging zone. Further, the electrical load of the wireless-power receiver may be rapidly fluctuated to create a more easily noticeable change in impedance at the power-transmitting antenna.

Additionally, or alternatively, physical characteristic data related to physical characteristics of the power or information exchange, may be used for validating the pairing process. Such physical characteristic data may include the received signal strength indicator (RSSI) of the advertisement signal, the power sent by a power-receiving antenna (413 in FIG. 4) during the broadcast of an advertisement signal, and power-receiving antenna gain. Any one or more of the timing criterion, impedance criterion, and physical characteristic data can be used to validate or invalidate the pairing process between a wireless-power receiver and a wireless-power transmitter. It will be understood by a person skilled in the art that those criteria have some limitations and in some cases cross-connection may still happen. However, using one or more of the methods may lower the probabilities of cross-connections.

In some embodiments, monitoring methods are used once the pairing is established to detect and confirm that the pairing and communication channel are properly established between a wireless-power transmitter and an intended wireless-power receiver in the charging zone of the docking station. The monitoring methods generally allow for effecting a change on exchanged signals or power signals between a wireless-power transmitter and a wireless-power receiver, and monitoring that the change is received, thereby validating that a wireless-power transmitter is properly connected to the desired wireless-power receive. For example, one monitoring method comprises varying, for a given period of time, a current that flows into the power-transmitting antenna, measuring or monitoring, during that same period of time, the voltage of the wireless-power receiver and sending voltage measurements to the wireless-power transmitter using the wireless communication module. If no significant change is detected in the voltage measurements of the wireless-power receiver or if the voltage changes do not correspond with the current variations of the power-transmitting antenna, the docking station may detect that cross-connection has occurred. More than one iteration of this method may be performed to confirm proper connection or detect cross-connection, since a mismatch between voltage measurements of the wireless-power receiver and current variation of the power-transmitting may not necessarily be indicative of a cross-connection. For example, the mismatch may be caused by the wireless-power receiver being moved within the charging zone while performing the method.

Another monitoring method is to monitor the power being sent into the power-transmitting antenna or at any other point in the wireless-power transmitter and compare it to the measured power at the wireless-power receivers in the charging zone. The wireless power transfer efficiency may vary from one use case to another, but a possible range of efficiency may be defined as a reference to detect cross-connection. For example, if the wireless-power transmitter uses 8 W of power and one of the wireless-power receivers measures 5 W of power being delivered to the portable device battery, the docking station may determine that the wireless-power receiver is properly paired to the wireless-power transmitter. However, if the one of the wireless-power receiver delivers 30 W to a portable device, the docking station may determine that cross-connection has occurred since the power delivery efficiency is above 100%. In such a case, the docking station may then unpair the wireless-power receiver from the wireless-power transmitter.

As mentioned above, the wireless-power transmitter 310 and the wireless-power receiver 320 may first establish a wireless communication channel by pairing, the pairing process comprising making some validations to limit cross-connection, using for example timing, impedance, and characteristic criteria. Various monitoring methods described previously, such as power or voltage regulation and monitoring, may further be used by the wireless-power transmitter 310 and the wireless-power receiver 320 after the pairing is successful to ensure that the communication connection is properly established between the wireless-power receiver 320 and the wireless-power transmitter 310 sending power to the wireless-power receiver 320. This reduces the risk of cross-connection and cross-communication with any wireless-power transmitter not sending power to the wireless-power receiver 320, such as for example a wireless-power transmitter located at a different workstation.

Once the pairing process is successful, the wireless-power transmitter 310 sends identification-related information identifying itself (referred to as Tx ID in the FIG. 3, or alternatively PTU-ID), or alternatively identifying the docking station, through the wireless communication channel using the communication means to the wireless-power receiver 320, and the wireless-power receiver 320 sends the identification-related information to the portable device 330 using wired communication to ensure no cross-communication with unwanted devices. A software application module 360 may be used for exchanging additional information with a database 350. In some embodiments, the software application module 360 may be installed on the portable device 330. In other embodiments, the software application module 360 may a web-based application instead.

In an embodiment, a portion of the software application module 360 or a separate plug-in is configured to frequently probe a memory address related to the wireless communication channel established between the wireless-power receiver and the wireless-power transmitter 310 and detect new identification-related information that the portable device 330 may receive. A driver may be installed to retrieve the identification-related information on the portable device, depending on the type of portable device and connector used. The software application module 360 may subsequently use the retrieved identification-related information for sending a set of requests to the database 350. In some embodiments, the set of requests may include retrieving a unique position associated with the identification-related information, where the unique position may identify a physical position associated to the identification-related information, such as the physical location of the wireless-power transmitter, for example a floor, a room, a row and a position in the row associated to the wireless-power transmitter. Based on the unique position, identifications for all peripheral devices 340 associated to the unique position, and corresponding additional information necessary to establish a connection are retrieved. The additional information may include SSID of the peripheral devices and a wireless communication type to use for specific peripheral devices. Alternatively, only a subset of identifications of the peripheral devices 340 and corresponding additional information may be retrieved, according for example to user preferences. The set of requests used may depend on user preferences, type of device, wireless protocol compatible with the device and other criteria. The portable device 330 may then use the identifications (peripheral ID in FIG. 3) of the peripheral devices 340 and corresponding additional information to automatically connect to one or more peripheral devices 340 with appropriate wireless communication protocols. The connection process depends on the type of wireless communication protocol but may often include an acknowledgement message sent by the peripheral device indicating that the connection was successful.

In other embodiments, the wireless-power transmitter 110 may send its own identification which the portable device 130 may associate with one or more peripheral devices ID, generally located on the same table 150 as the wireless-power transmitter 110, using the database 350 or other methods. Alternatively, the wireless-power transmitter 110 may be configured to transfer all the information relating to the peripheral device 140 needed to connect the portable device to the peripheral device, without using a database.

In some embodiments, the portable device may send an acknowledgement message to the wireless-power receiver indicating that the identification-related information was received. Further, the wireless-power receiver may repeatedly transfer the identification-related information to the portable device until the acknowledgement message is received from the portable device. The wireless-power receiver may also send an acknowledgement message to the wireless-power transmitter once the identification-related information transmitted by the wireless-power transmitter is received by the wireless-power receiver. Further, the wireless-power transmitter may repeatedly transmit the identification-related information to the wireless-power receiver until this acknowledgement message is received.

Eventually, wireless-power transmitters or peripheral devices may be moved and/or replaced from one workstation to another. The database 350 may then store non-accurate information. Different methods may be used to keep the database 350 up to date. For example, when performing a manual connection between the portable device 330 and a peripheral device 340 not associated with the wireless-power transmitter 310 in the database 350 using the software application module 360, an update of the database 350 may be triggered. The updated database 350 will subsequently allow the software application module to automatically connect to the given peripheral device on subsequent connection attempts at this specific position.

The database 350 may be stored on storage means located on the portable device 330, on an accessible local network, or in a remote location accessible with an internet connection, according to various embodiments.

The software application module 360 further provides, as a non-limiting example, functions for wirelessly connecting to peripheral devices 340, functions for defining user preferences, functions for allowing the user to update the database manually and other related functions. In some embodiments, the software application module 360 may further include sub-modules, or functions, for securing the connection between the database 350 and the devices allowed to access and/or edit the database 350. The software application module may also include functions for automatically disconnecting the wireless communication channel between the portable device 330 and peripheral devices 340 when the portable device 330 is moved out of the charging zone. This may be done with or without the user approval depending on the user preferences or the organization who manages the working space for example. Additionally, some types of communication protocols need the peripheral device to be in pairing mode in order to connect to them, as for example Bluetooth. The software application module 360 may be configured to put a peripheral device in pairing mode before connecting to it if the software application module has the proper permissions. Further, in some embodiments, the software may additionally put a peripheral device back in pairing mode while disconnecting them from a portable device. In other embodiments, the software application module may further include other features such as battery management.

Referring now to FIG. 4, a functional block diagram is shown comprising a wireless power transfer and docking station, in which a portable device 430 is being charged by a wireless-power receiver 420 receiving power from a wireless-power transmitter 410 and further receiving identification-related information to automatically and wirelessly connect to peripheral devices 440. It will be noted that in FIG. 4, the direction of the arrows is indicated to better explain the flow of the identification-related information between different components, but in other embodiments, or for other types of information, the communications can be bidirectional. A power source (not shown) is connected to the wireless-power transmitter 410 using a power connector 411. An input power conversion module 412, containing circuitry for conditioning an input power signal from the power connector 411 into a converted power signal, or simply power signal, is operatively connected to the power connector 411. The conversion module 412 typically includes different submodules, such as an amplification module and a module to reduce power signal reflections. Input power signal conditioning may include regulating the input power signal, amplifying the input power signal at any frequency, modifying, and matching an impedance of parts of the circuitry, for example. A power-transmitting antenna 413 is configured to emit an alternating field corresponding to the power signal going through it. The power-receiving antenna 421, comprised in the wireless-power receiver 420, receives the alternating field of the power signal, and an output power conversion module 422, comprised in the wireless-power receiver 420 and containing circuitry for converting the power signal, converts the power signal into a device-compatible power signal adapted to charge a portable device battery 431. In some embodiments wherein the wireless-power receiver 420 is external to the portable device 430, the device-compatible power signal is transferred from a power connector of the wireless-power receiver 420 connected to the portable device 430. In other embodiments in which the wireless-power receiver 420 is integrated to the portable device 430, the device-compatible power signal may be transferred using circuitry integrated in the portable device 430.

In preferred embodiments, the power-transmitting antenna 413 and the power-receiving antenna 421 are tuned to be resonant at a determined similar frequency, which may also correspond to the frequency of the converted power signal.

Further referring to FIG. 4, the wireless-power transmitter 410 includes a transmitter-controller 414. The transmitter-controller 414 may be configured for a variety of functions such as acquiring different measurements related to the wireless-power transmitter, controlling at least partially the input power conversion module 412 and controlling a transmitter wireless communication module 415. The measurements may include DC voltage and current measurement, AC voltage and current measurement and internal temperature measurement, for example, and may be used by some of the methods and/or criteria evaluation for limiting cross-connection as previously described. The transmitter communication module 415 communicates with the receiver communication module 423 using one of various communication protocols, including, but not limited to, Wi-Fi, Bluetooth, and Bluetooth Low Energy (BLE), to exchange the identification-related information, for example. The transmitter-controller 414 comprises a storage medium for storing computer readable instructions that can be executed by the transmitter-controller to perform the functions and further for storing identification-related information, for example. Further, the transmitter wireless communication module 415 may also comprise a storage medium for storing communication-specific readable instructions that can be executed by the transmitter wireless communication module.

In some embodiments, the identification-related information may alternatively be exchanged between the wireless-power transmitter 410 and the wireless-power receiver 420 using signal modulation of the power signal.

The receiver-controller 424 controls the identification-related information exchanged from or to the receiver communication module 423 and may additionally be configured for performing other functions such as acquiring measurements related to the wireless-power receiver 420 and adjusting the output power conversion module 422. Further, the receiver-controller 424 comprises a storage medium for storing computer readable instructions that can be executed by the receiver-controller to perform the functions and further for storing identification-related information, for example. Further, the receiver wireless communication module 423 may also comprise a storage medium for storing communication-specific readable instructions that can be executed by the receiver wireless communication module.

The transmitter-controller and the receiver-controller described herein may comprise, without being limited to, microcontrollers, microprocessors, and field programmable gate arrays (FPGA). The term "controller" is meant to encompass software and hardware modules, such as chips, expansion cards or any stand-alone device, which can manage or direct communications between two entities, or which interfaces and controls data flow between devices.

As described hereinabove, in order to limit cross-connection and cross-communication, the wireless-power transmitter 410 may transmit power beacons, using the transmitter modules comprised in the wireless-power transmitter 410, and the wireless-power receiver 420 may use power received from the power beacons to activate different modules comprised in the wireless-power receiver 420 to establish a pairing and a wireless communication channel with the wireless-power transmitter 410. Further, the pairing may then be validated by a monitoring method, such as varying transmitted power, using the power-transmitting antenna 413 and verifying changes in the power received by the power-receiving antenna 421 of the wireless-power receiver 420. Other methods as previously described may additionally or alternatively used to validate the pairing between the wireless-power receiver 420 and the wireless-power transmitter 410.

Once the wireless communication channel is established between the wireless-power transmitter 410 and the wireless-power receiver 420, the transmitter-controller 414 may request that the transmitter communication module 415 transmits a unique information signal, or identification-related information, identifying the wireless-power transmitter for example. The receiver communication module 423 receives this signal and sends it to the receiver-controller 424. In embodiments where the wireless-power receiver 420 is external to the portable device 430, the receiver-controller 424 sends this identification-related information to the portable device 430 using either the connector used for transferring power to the portable device 430 or another data connector. A device controller 432 may then retrieve this information using a software application module and/or a driver. The identification-related information may be used by the software application module to retrieve peripheral device information identifying peripheral devices 440 associated to the wireless-power transmitter 410 from a database 433. Additional information may further be retrieved from the database 433. The device controller 432 may use the peripheral device information to automatically attempt connection, with or without user approval, with one or more of the peripheral devices 440 identified in the database 433.

In some embodiments, the transmitter and receiver communication modules 415 and 423 may be physically integrated with the transmitter-controller 414 and the receiver-controller 424, respectively, but they are considered separate herein to illustrate their purpose.

In possible embodiments, the wireless-power receiver 420 may be integrated to the portable device 430 and the modules comprised in the wireless-power receiver 420 may be integrated to the main circuit board of the portable device 430. In other embodiments, one or more of the modules comprised in the wireless-power receiver 420 may be located on a different circuit board while also integrated into the portable device 430, and may communicate with the rest of the portable device circuitry using wires or circuit board junction.

Figure 5A:
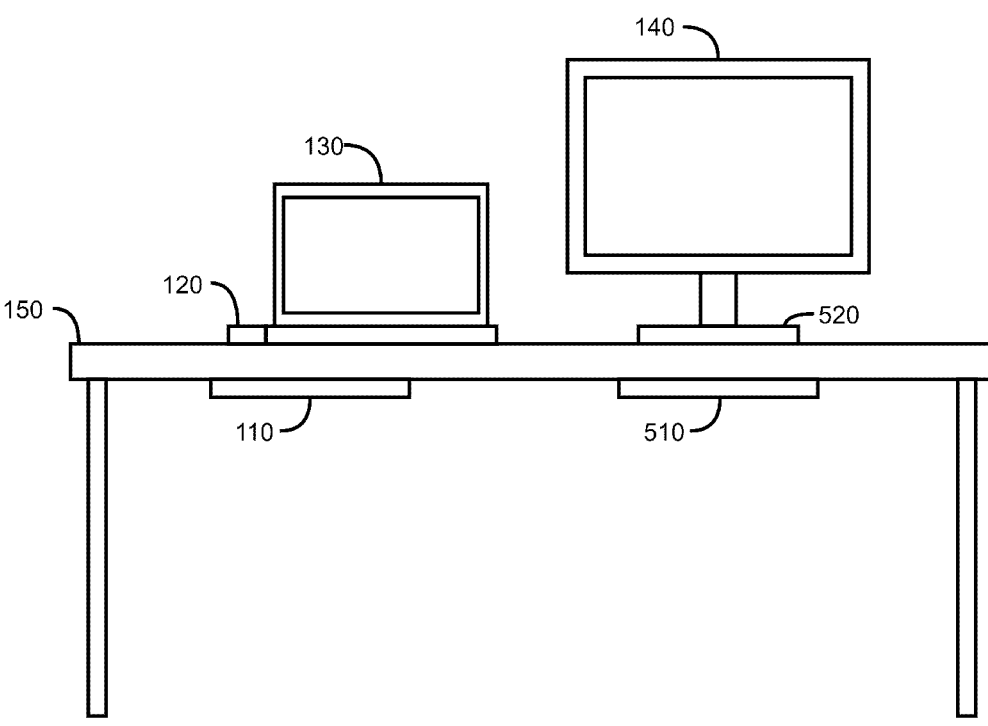
FIG. 5A is a schematic illustration showing a wireless power transfer and docking station comprising two wireless power transmitters, according to a possible embodiment.

FIG. 5A shows another possible embodiment of the wireless power transfer and docking station where a portable device 130 and an external peripheral device 140 are each charged and/or powered by respective wireless-power transmitters 110 and 510. FIG. 5A shows a peripheral device 140 that resembles a computer monitor only to give an example Further, more than one peripheral devices may be present. This embodiment eliminates power cables previously necessary for peripheral devices that are not battery powered and/or eliminate the need to change batteries for peripheral devices that are battery powered.

The explanations provided with reference to FIG. 1 are still applicable regarding power transfer to the portable device 130. A similar power transfer process may also be used for powering the peripheral device 140. The wireless-power transmitter 510 emits an alternating field which is received by the power-receiving antenna of the wireless-power receiver 520 and converted into a device-compatible power signal for charging or powering the peripheral device 140. In some embodiments, the wireless-power receiver 520 may be integrated to the peripheral device 140. As an example, the wireless-power receiver 520 may be integrated into a display monitor. The wireless-power transmitter 510 and the wireless-power receiver 520 may establish a wireless communication channel to exchange data related to the power transfer. As described hereinabove, the pairing between the wireless-power transmitter 510 and the wireless-power receiver 520 may be validated using power variations schemes or other methods described, to limit cross-communication.

In some embodiments, the wireless-power receiver 520 may transmit identification-related information to the wireless-power transmitter 510, identifying the peripheral device 140, for example. The information sent may include SSID of the peripheral device and a type of communication protocol needed to connect to it. The wireless-power transmitter 510 may then exchange the identification-related information to the wireless-power transmitter 110 using either wireless or wired communications means, according to different embodiments. Wireless communication means may be used between the wireless-power transmitter 110 and the wireless-power transmitter 510 without increasing risks of cross-communication with other wireless-power transmitters. For example, a logical link between the two wireless-power transmitters 510 and 110 may be registered in the transmitter-controller of the wireless-power transmitter 510 or in the transmitter-controller of the wireless-power transmitter 110. For example, the identification-related information of the wireless-power transmitter 510 may be registered, encoded or stored in the storage medium of the transmitter-controller of the wireless-power transmitter 110. If one of the wireless-power transmitters is moved, the registration may need to be updated on one or more of the wireless-power transmitters. In some embodiments, this update may be performed manually by opening the product and programming it. In alternative embodiments, it may be possible to communicate the new registration to the wireless-power transmitter using Wi-Fi or other wireless communication means compatible with the capabilities of the wireless-power transmitters. For example, a portable device or computer provided with the software application module may push the updated registration via Wi-Fi to the one or more wireless-power transmitters at the old and new location if necessary. In other embodiments, the wireless-power transmitters 110 and 510 may be physically connected by a cable allowing data transfer, when installed at the same table 150 or working station.

Once the wireless-power transmitter 110, charging the portable device 130, gets the identification-related information identifying a peripheral device, a flow of information similar to the one described in reference to FIG. 2 may start. The wireless-power transmitter 110 may be configured to send an identification-relation information received from another wireless-power transmitter. For example, the wireless-power transmitter 110 may always send its own identification-related information along with any identification-related information that may be received from other wireless-power transmitters to the wireless-power receiver 120. Accordingly, the portable device 130 receives all possible information, and may automatically connect to the peripheral device 140 charged by the wireless-power transmitter 510 and to other peripheral device identified using a database, for example, as described in reference to FIGS. 1-4. The identification-related information may be exchanged from the wireless-power transmitter 110 to the wireless-power receiver 120 and then to the portable device 130. In some embodiments, the identification-related information is enough for automatically attempting a wireless connection with the peripheral device 140. In other embodiments, a search in the database may still be performed to acquire additional information on the peripheral device 140 necessary for automatically attempting the wireless connection, such as SSIDs and communication protocols to use. The identification-related information identifying the peripheral device 140 may be used as a query in the database. At this point, appropriate wireless communication protocols may be used to connect to these peripherals.

In preferred embodiments, a laptop may be placed within the charging zone of the first wireless-power transmitter 110 and start charging via the wireless-power receiver 120. It may receive identification-relation information related to the peripheral device 140 being charged, powered, or simply located within one of the charging zones at the same workstation 150. The laptop, using the software application module, may automatically attempt to connect to the peripheral devices 140 with or without user approval. A peripheral device 140 may be a computer monitor, and if connection is successful, the laptop may automatically start casting to the monitor by either extending its laptop screen or mirroring it, for example. Therefore, the present application may resemble a totally wireless docking solution.

The wireless-power receiver 120 may either be external or integrated to the peripheral devices, according to various embodiments, without changing the main functionalities of the wireless-power receiver 120. In embodiments where the peripheral devices 140 need an external dongle device to communicate wirelessly with the portable device 130, such as a computer monitor having no wireless communication means, the wireless-power receiver 520 may only be connected to the external dongle instead of the peripheral device 140.

Figure 5B:
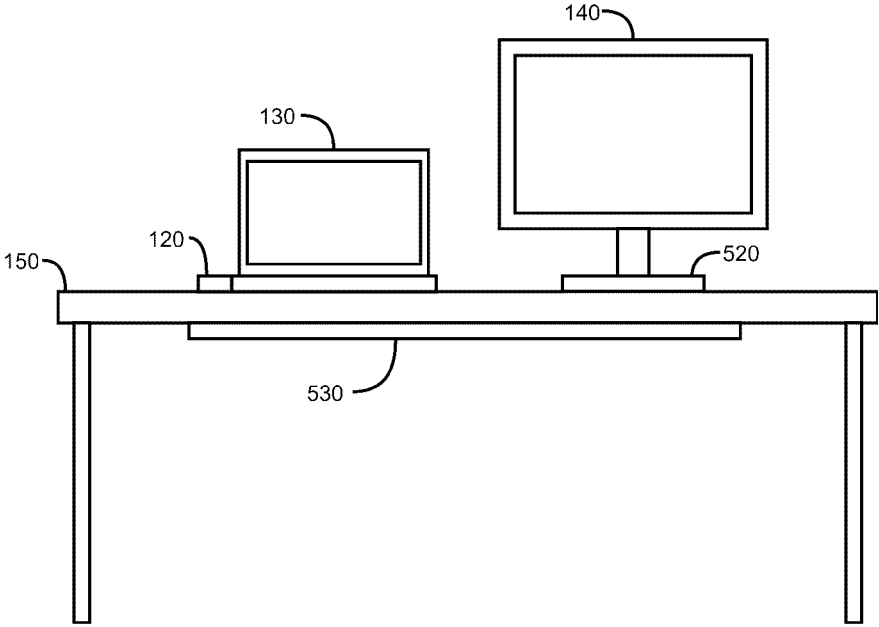
FIG. 5B is schematic illustration showing yet other exemplary embodiment of the wireless power transfer and docking station.

FIG. 5B shows another possible embodiment of the present application where a wireless-power transmitter 530 charges the portable device 130 together with the peripheral device 140, via the wireless-power receivers 120 and 520. The wireless-power transmitter 530 may also establish wireless communication channels with all the devices it charges or powers. All the wireless communication channels are centralized on a single transmitter, therefore allowing a simplified flow of information between the peripheral device 140 and the portable device 130 and further reducing the probability of cross-communication with unintended peripheral devices. The wireless-power transmitter 530 may request and/or receive the identification-related information related to the peripheral device 140 located in charging zone of the wireless-power transmitter 530 and transmit the identification-related information to the portable device 130 located in the same charging zone. The portable device 130 may then automatically attempt connecting to the peripheral device 140. In some embodiments, additional information may be retrieved from a database before attempting to connect, such as SSIDs and communication protocols to use for connecting to the peripheral device 140. The wireless communication connections between the portable device 130 and the peripheral device 140 may be established using any wireless communication protocol, and may be automatically established with or without user authorization.

Figure 6A:
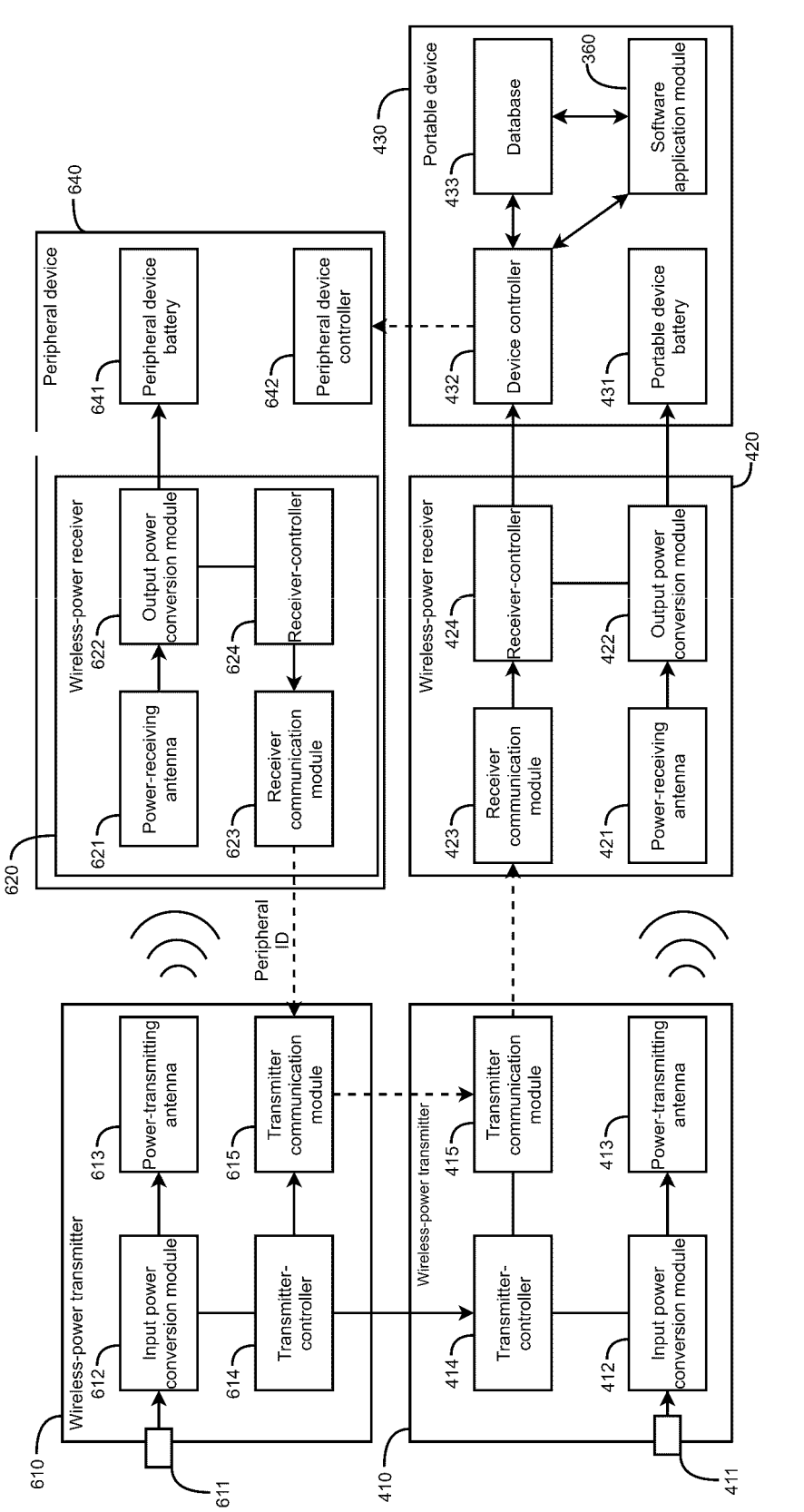
FIG. 6A is a functional block diagram corresponding to the wireless power transfer and docking station of FIG. 5A.

FIG. 6A is a functional block diagram describing the embodiment shown at FIG. 5A. The details in reference to FIG. 4 regarding power transmission from the wireless-power transmitter 410 to the portable device 430 apply. The power transmission from the wireless-power transmitter 610 to the peripheral devices 640 may involve similar functions. The input power conversion module 612 receives an input power signal from a power source (not shown) through a power connector 611 and converts it into a power signal. The power signal is transmitted by a power-transmitting antenna 613, received by a power-receiving antenna 621 and converted by an output power conversion module 622 into a device-compatible signal appropriate for charging a peripheral device battery 641. A wireless-power receiver 620, also comprises a receiver-controller 624 and a receiver communication module 623 allowing for exchanging information with the wireless-power transmitter 610, wherein the information may be identification-related information.

The wireless-power receiver 620 operatively connected to the peripheral device 640 and located in the charging zone of the wireless-power transmitter 610 may send an identification-related information associated to the peripheral device 640 to the wireless-power transmitter 610 regardless of the presence of the portable device 430 in the charging zone of the wireless-power transmitter 410. The wireless-power transmitter 610 may then exchange with the wireless-power transmitter 410 the identification-related information associated to the devices located in the charging zone. The wireless-power transmitters 410 and 610 may exchange the information with each other using wireless or wired communication means, using cables connecting the wireless-power transmitters 410 and 610, for example. In other embodiments, the wireless communication means may comprise the transmitter-controllers 614 and 414 and further comprise transmitter communication modules 615 and 415. When the portable device 430 is located in the charging zone of the wireless-power transmitter 410 and tested to limit cross-connection, the wireless-power transmitter 410 may send the identification-related information associated to the peripheral device 640 last received to the wireless-power receiver 420. The wireless-power receiver 420 may then exchange the identification-related information to the portable device 430 using wired connection. The device controller 432 may access the database 433 to retrieve additional information corresponding to the identification-related information received from the wireless-power receiver 420 before automatically attempting a wireless connection to the peripheral devices 640. Alternatively, using the identification-related information, the portable device controller 432 may automatically attempt a wireless connection to the peripheral device controller 642 using wireless communication means of both devices. In embodiments where the portable device or the peripheral devices do not comprise integrated wireless communication means, dongles may be connected to provide the wireless communication means.

When the wireless-power transmitter 410 does not receive any identification-related information associated to peripheral devices, the embodiments described in reference to FIG. 3 and FIG. 4 apply. The identification-related information associated to the wireless-power transmitter 410 is still sent and used by the device controller 432 to retrieve peripheral devices associated with the wireless-power transmitter 410 in the database 433.

In some embodiments, the portable device 430, such as a laptop, may be configured by the software application module and according to user preferences to automatically attempt connecting with a given peripheral device 640, such as a computer monitor, every time the portable device 430 along with the wireless-power receiver 420 is placed into a charging zone of a given wireless-power transmitter 410. The software application module may allow a user to configure such user preferences. The portable device 430 may request or receive, through the wireless-power receiver 420 and to the wireless-power transmitter 410, the identification-related information of the given peripheral device 640 or the identification-related information of the wireless-power transmitter 410. Additional information necessary automatically connecting to the peripheral device 640 may then be retrieved in the database 433 if necessary.

It will be understood that the wireless-power transmitters 410 and 610 described herein may be interchangeable. The peripheral device 640 may be placed in the charging zone of the wireless-power transmitter 410, and the portable device 430 in the charging zone of the wireless-power transmitter 610, without affecting the embodiments described hereinabove, but simply changing the roles of the wireless-power transmitters 410 and 610.

In some embodiments, a multitude of wireless-power transmitters may be installed at a same place, such as a table or workstation, or in a same logical group, and interact with each other. In such cases, a first wireless-power transmitter may act as the wireless-power transmitter 410 described hereinabove, the first wireless-power transmitter being connected to the portable device 430 via the wireless-power receiver 420, and the other wireless-power transmitters may act as the wireless-power transmitter 610 described hereinabove. If another wireless-power transmitter is connected with a peripheral device 640, it will act similarly as the second transmitter 610. Further, all wireless-power transmitters may be interchangeable.

Figure 6B:
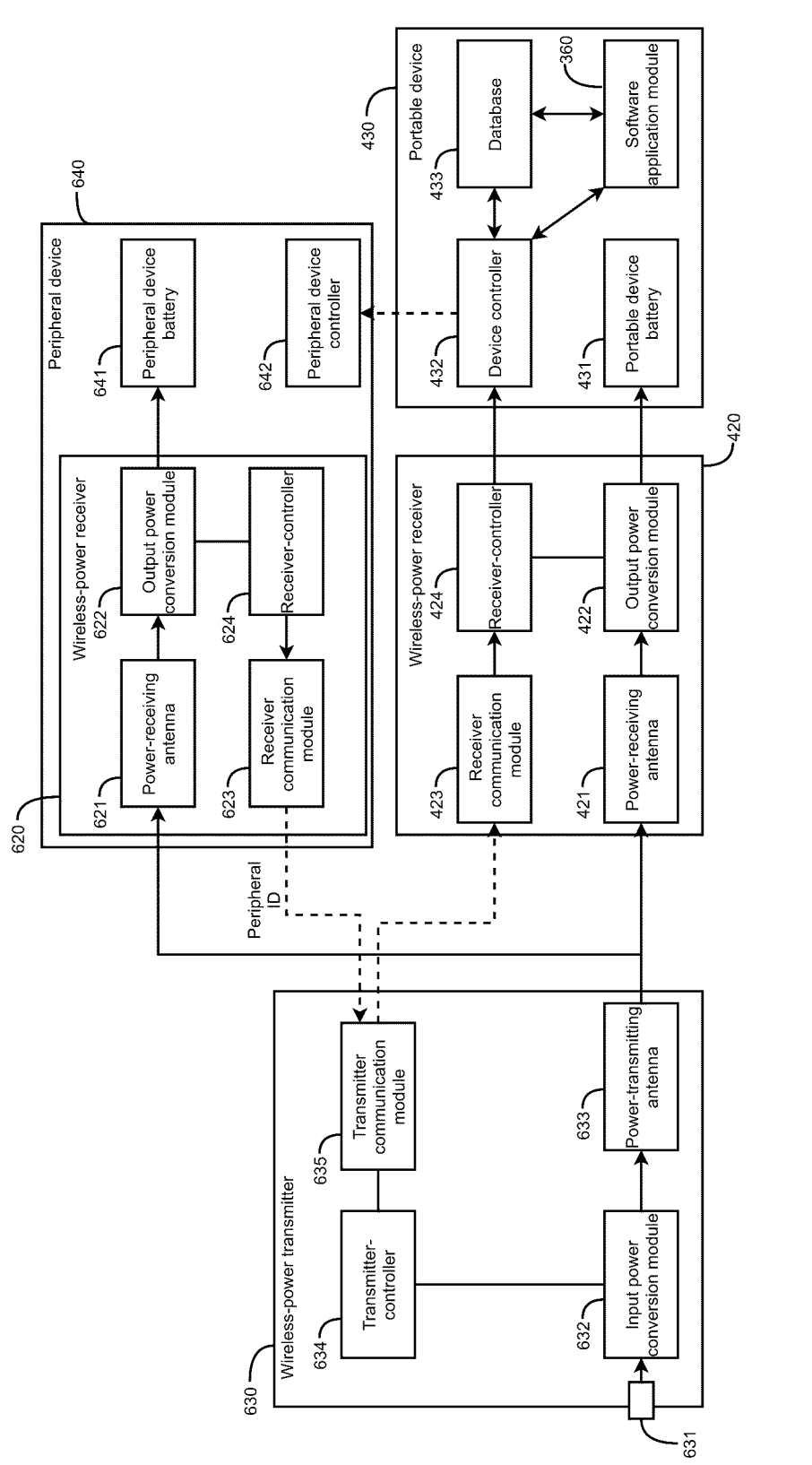
FIG. 6B is a functional block diagram corresponding to the wireless power transfer and docking station of FIG. 5B.

FIG. 6B is a functional block diagram describing the possible embodiment shown in FIG. 5B, wherein a single wireless-power transmitter 630 powers and/or charges one or more portable devices 430 and peripheral devices 640. The input power conversion module 632 and the power-transmitting antenna 633 are shown as single blocks, while in some embodiments there may be multiple instances of these modules in the wireless-power transmitter 630. The multiple instances of the modules may be used to deliver different field strengths at different positions in the charging zone. The transmitter-controller 634 communicates with both a wireless-power receiver 620 associated to peripheral devices 640 and a wireless-power receiver 420 associated to the portable device 430, by using the transmitter communication module 635. Such a configuration provides an advantage of removing the need for wired or wireless connections between multiple wireless-power transmitters such as in the embodiment of FIG. 6A. The transmitter-controller 634 may acquire the identification-related information associated with the peripheral devices 640 and transmit it to the portable device 430 through the wireless-power receiver 420 when the peripheral devices 640 or the portable device 430 enters the charging zone and connects with the wireless-power transmitter 630.

Figure 7:
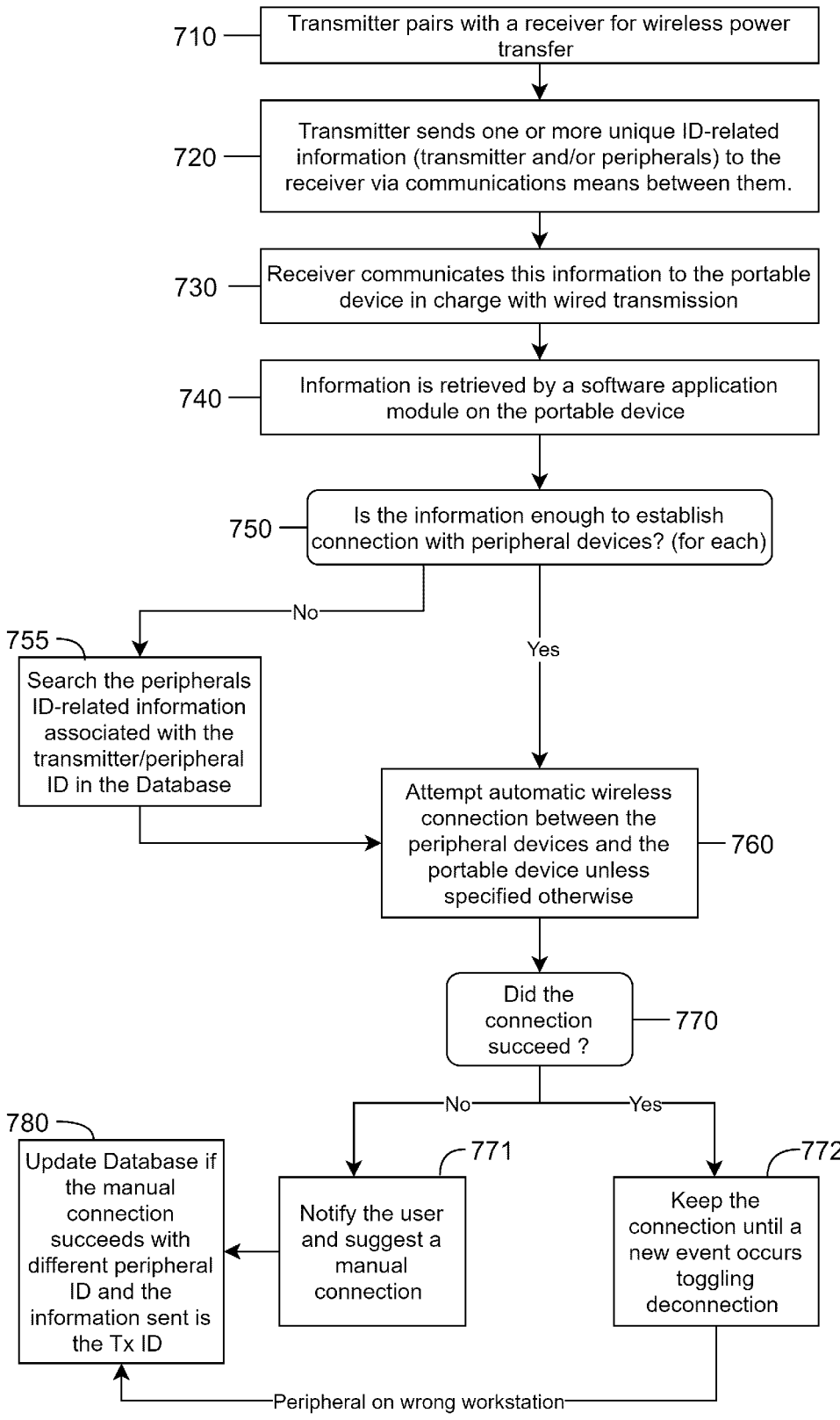
FIG. 7 is a flow chart of possible steps of a wireless charging method, according to a possible implementation.

FIG. 7 shows a flowchart of a possible embodiment comprising a method of connecting peripheral devices to a portable device when a portable device connected to a wireless-power receiver gets in the charging zone of a wireless-power transmitter. The method described herein can be performed with any embodiment described hereinabove.

Block 710 comprises steps for pairing, or connecting, a wireless-power transmitter with a wireless-power receiver and exchanging information for validating the pairing and establishing the connection. The pairing process may comprise emitting power beacons, or short spaced-apart periods of power bursts, from the wireless-power transmitter. The power beacons may activate the wireless-power receiver which may broadcast an advertisement signal. When the wireless-power transmitter receives the advertisement signal, it may validate, using various criteria, that the advertisement signal originates from the wireless-power receiver located in the charging zone of the wireless-power transmitter. The criteria may include timing, impedance, and characteristic criteria, as described in detail in reference to FIG. 3. Once the pairing is successful, monitoring methods may be used to confirm that pairing and wireless communication channels are properly established between the wireless-power transmitter and wireless-power receiver, as detailed hereinabove.

Once the wireless communication channel is established, block 720 comprises steps of exchanging identification-related information of the wireless-power transmitter or identification-related information of one or more peripheral devices to the wireless-power receiver. The steps and modules which may be used have been described when referring to previous figures. The exchange may proceed when the wireless communication channel is established between the wireless-power transmitter and the wireless-power receiver. If the wireless-power receiver is connected to a portable device with a wired connection allowing data transfer, steps of block 730 will follow. If the wireless-power receiver is connected or integrated in a peripheral device or other types of devices, next steps of the flowchart do not apply. The steps of the flowchart presented at FIG. 8 may apply instead in some embodiments.

Block 730 comprises steps for exchanging the identification-related information from the wireless-power receiver to the portable device. In some embodiments, the portable device may store this information in a storage means. In other embodiments, the identification-related information may be accessible at the wireless-power receiver through a communication port linking the wireless-power receiver with the portable device. Wired connection between the wireless-power receiver and the portable device has an advantage of reducing cross-communication with unintended devices. However, wireless connection between the wireless-power receiver and the portable device may still be used.

Block 740 comprises steps for retrieving the identification-related information by a software application module. The software application module may run in background on the portable device and periodically verify if new information is available. Alternatively, an alert or an event may be triggered when new information is exchanged by the wireless-power receiver to the portable device, as described in block 730. This alert or event may call a program, application or function to retrieve the new information. A separate plug-in or driver may have to be installed in some embodiments to retrieve the information on different kinds of portable device.

In some embodiments, the software application module may be a web-based application and thus not require any download or installation. The software application module may provide a link between a device controller of the portable device and a database. It may periodically verify a memory address of the communication port between the wireless-power receiver and the portable device or a memory address on the portable device associated to the transfer of the identification-related information. In such embodiments, the software application module may retrieve any new identification-related information exchanged between the wireless-power receiver and the portable device. The software application module may run in background or be visible to the user, and may include any necessary modules for accessing the memory addresses and communicating if necessary.

Block 750 comprises steps for analyzing, by the software application module, the type of information obtained. The software application module may analyze if the information retrieved in preceding steps is complete, allowing for automatically attempting to establish a wireless connection with a peripheral device, or if retrieving additional information in the database is necessary. The information received, such as the identification-related information, may be a wireless-power transmitter identification (Tx ID), in which case the database has to be used to retrieve all the additional information related to the one or more peripheral devices associated with the wireless-power transmitter necessary for automatically attempting to connect to the one or more peripheral devices.

In some embodiments, the information may be the identification-related information associated to the one or more peripheral devices but may be incomplete for connecting to the one or more peripheral devices. Complementary and unique additional information on the identified one or more peripheral devices may then be retrieved from the database, such as a password and communication protocol to use, for example.

Block 755 comprises steps performed if the information received from the wireless-power transmitter is incomplete. The software application module may retrieve additional information from the database such as peripheral identification associated with the wireless-power transmitter and user preferences, as user preferences may indicate which kind of peripheral device to connect to, for example. The database may include a multitude of types of identification information and/or necessary connection information associated to peripheral devices and/or wireless-power transmitters. The connection information is needed to automatically connect to the peripheral devices associated to a wireless-power transmitter or docking station. Peripheral devices associated with a wireless-power transmitter in the database may correspond to the peripheral devices that were associated with the wireless-power transmitter at their last connection or peripheral devices that were associated with the wireless-power transmitter through manual modifications of the database.

The software application module may further include sub-modules, or functions, for communicating with the database and exchanging the identification-related information retrieved. The database may be stored on a cloud server for example, and accessed through a web-based application with an internet connection. The database may also be stored on a local server and the software application module or a plug-in may communicate with the local server through a local network or other communication means.

The software application module may further comprise sub-modules, or functions, for executing two-way communications with the database and a server. The software application module may first send the identification-related information received from the wireless-power receiver and retrieved by the software application module to the database. The database may then retrieve additional information related to the identification-related information received and send the additional information back to the software application module. In some embodiments, the software application module may also send instructions to the database regarding the type of additional information to retrieve, based on the user preferences, device type or other criteria. In some embodiments, the database may further store user preferences, such as preferences that may be used to automatically attempt connecting to a given peripheral device when a given portable device is placed in the charging zone of a given wireless-power transmitter. In other embodiments, the user preferences may be stored on the portable device. The user preferences may further identify types of peripheral devices for which an automatic connection should be attempted and types of peripheral devices for which an automatic connection should not be attempted. Other user preferences may also include authorizing automatic connection attempts or requesting authorization from the user beforehand. The software application module may retrieve additional information from the database according to the user preferences. Such user preferences and associated user identification or portable device identification may be exchanged between the software application module and the database.

Block 760 comprises steps for establishing a wireless connection between the portable device and the peripheral devices using appropriate wireless communication protocols supported by the devices attempting to connect. Identification-related information and, in some embodiments, additional information, retrieved at blocks 750 and/or 755, are used to attempt establishing a connection between the portable device and the peripheral devices. If user preferences are accessible, they may also be applied.

The software application module may further include sub-modules, or functions, for performing the steps of block 760. The software application module may be responsible for using all necessary information retrieved and for communicating commands to the portable device controller, which may attempt to establish a wireless connection to the peripheral devices. The software application module may perform all the steps in the background on the portable device, or in some embodiments, authorization may be requested before attempting to connect to peripheral devices. Accordingly, the user preferences may comprise automatic connection permissions, indicating, for each peripheral device type for example, whether user authorization must be requested before attempting connection.

Block 770 comprises steps for verifying if the connection between the portable device and the peripheral devices succeeded. The verification may comprise different steps depending on the peripheral devices and communications protocols used. If the connection could not be established with a peripheral device, subsequent steps of block 771 are performed. If the connection is successful, subsequent steps of block 772 are performed.

The block 771 comprises steps for notifying the user that the connection with one or more peripheral devices has failed. The notification may be provided using various methods. In some embodiments, for example, the software application module may open a pop-up window including different options, such as suggesting a manual connection attempt by selecting the peripheral devices located on the workstation or table. The pop-up window may also include an option to periodically attempt to connect to the peripheral devices. The pop-up window may further include an option of cancelling any further attempt to establish a connection with the peripheral devices.

The block 772 comprises steps eventually performed when the portable device succeeds in establishing a wireless connection to peripheral devices. Such steps comprise detecting that the portable device or the wireless-power receiver has left a charging zone of the wireless-power transmitter and proceeding to disconnecting any peripheral device currently connected to the portable device. The steps may also include reacting to other different disconnection events that may trigger a disconnection between the portable device and the peripheral devices, such as the wireless-power receiver being out of the charging zone of the wireless-power transmitter for a given period of time, and the strength of the wireless connection with the peripheral device getting too low. For example, when the connection strength between the portable device and the peripheral device falls below a given threshold that may be defined manually, automatically, or according to the wireless communication protocol, disconnection may be performed. When peripheral devices and/or wireless-power transmitters are moved but the database is not updated, connection between the portable device and peripheral devices may still be established even if the moved peripheral devices are not located at the same workstation or in a same logical group. In such case, the user may not be notified of a problem, and the software application module may further include means to manually disconnect any peripheral device. The software application module may also allow for manually connecting to any peripheral devices located at the workstation associated to the wireless-power transmitter transmitting power to the portable device for which no entry is available in the database, for example.

In some embodiments, the software application module communicates with the database when a connection succeeds to send commands for updating the information stored in the database associated to the wireless-power transmitter or to the peripheral devices.

Block 780 comprises steps performed when a connection between the portable device and a peripheral device is manually established. The software application module further includes sub-modules, or functions, for verifying that the peripheral device manually connected is associated with wireless-power transmitter in the database. If the wireless-power transmitter identification is available, and the position of the peripheral device manually connected to the portable device is not associated with the wireless-power transmitter position in the database, the database may be automatically updated. In some embodiments, where wireless-power transmitters are also subject to being moved from one table to another, a validation from the user may be requested regarding whether the wireless-power transmitter or the peripheral device has moved. For example, if the workstation identified by the user matches the expected position associated with the identification-related information received, the software application module may determine that only the peripheral device association has to be updated in the database. The database may also be updated if new additional information associated to wireless-power transmitters or peripheral devices becomes available. Updating the database may reduce the number of manual connections necessary and may provide up-to-date information regarding a pool of workstations, wireless-power transmitters, and peripheral devices. Various ways well known in the art may be used to manually connect to peripheral devices. Alternatively, the software application module may be used to establish manual connections with peripheral devices.

In some embodiments, the software application module may request user authorization before updating the database. The update may be executed for every connection depending on the context, the environment and possibly user preferences.

In a possible embodiment, a portable device, such as a laptop, connected with a wireless-power receiver, is placed in the charging zone of wireless-power transmitter installed at a workstation. A computer monitor, not wirelessly charged, but accessible according to information stored in the database, is located at the workstation. Following the steps of blocks 710, 720, 730, 740 and 750, the identification-related information of the wireless-power transmitter is sent to the portable device via the wireless-power receiver and identified as such. The database may be accessed using a software application module as described at block 755 to retrieve additional information necessary to connect the portable device to the computer monitor located at the workstation. The software application module may then attempt a connection between the portable device and the computer monitor through a specified wireless communication protocol, such as wireless HDMI communication protocol, as described at block 760. If the additional information retrieved from the database is up to date, the wireless connection should succeed. If the computer monitor was moved since last connection, or it is not powered or if there is any other issue, the wireless connection will fail, and the connection may need to be manually established. As described at block 780, the database may then be updated if the manual connection succeeds, according to new information regarding the peripheral device, such as a new association with the wireless-power transmitter, or any other relevant information, such as an appropriate communication protocol. The updated information should allow for automatically connecting to the computer monitor in subsequent attempts.

The steps of blocks 750 and 770 may be repeated for every peripheral device located at a workstation or table, in a logical group, or identified and associated to the wireless-power transmitter in the database.

FIG. 8 is a flowchart of steps performed when a peripheral device is connected to a wireless-power receiver. The wireless-power transmitter and the wireless-power receiver connected to the peripheral device are first paired to establish a wireless communication channel, and cross-connection validations are made. Additionally, the type of device connected to a wireless-power receiver may be determined in block 810. For example, when a wireless-power receiver is connected to a peripheral device, the wireless-power receiver may include the identification-related information of the peripheral device, or other information associated to the peripheral device. For example, the identification-related information of the peripheral device may be registered, encoded or stored in the storage medium of the receiver-controller of the wireless-power receiver. Block 820 comprises steps for transmitting, from the wireless-power receiver connected to the peripheral device to the wireless-power transmitter, the identification-related information associated to the peripheral device once the wireless communication channel is established between the wireless-power receiver and the wireless-power transmitter. Block 830 comprises steps for exchanging the identification-related information received by the wireless-power transmitter to another wireless-power transmitter. For example, when at least two wireless-power transmitters are located at the same table or workstation, or in a logical group, the wireless-power transmitter paired to the wireless-power receiver connected to the peripheral device may transmit the identification-related information to the other wireless-power transmitter(s). In some embodiments, transmission of the identification-related information may be performed using a wired connection, for example if the wireless-power transmitters are located under the table or integrated to the table and sharing a wired connection. Alternatively, the wireless-power transmitters may exchange information wirelessly. The link between wireless-power transmitters at a same table or workstation may be registered in at least one of the wireless-power transmitters. For example, the identification-related information of one of the wireless-power transmitters may be registered, encoded, or stored in the transmitter-controller of the other wireless-power transmitter.

In some embodiments, the wireless-power transmitter paired to the wireless-power receiver connected to the peripheral device may only exchange the identification-related information to wireless-power transmitters associated to portable devices and not to wireless-power transmitters associated to other peripheral devices or other types.

In some embodiments, such as the one described in FIG. 5B, the steps of block 830 may be skipped. In such embodiments, a single wireless-power transmitter may power and communicate with peripheral devices and portable devices. The wireless-power transmitter may then store the identification-related information associated to the peripheral devices paired with the wireless-power transmitter until a portable device is paired with the same wireless-power transmitter. The steps of FIG. 7 may then be performed. If a portable device is already paired to the same wireless-power transmitter, the steps of FIG. 7 may be performed directly after the steps of block 820.

Figure 9:
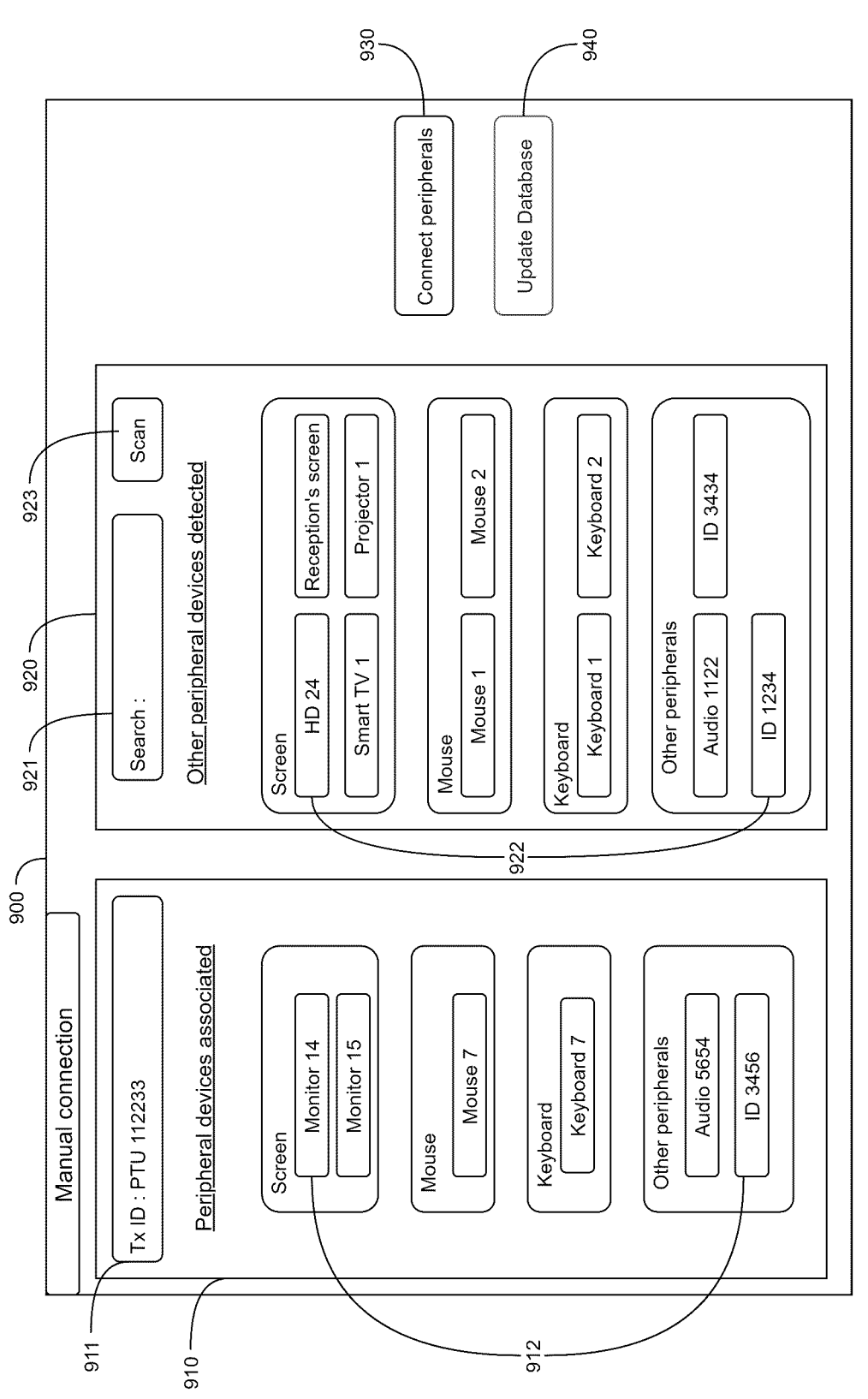
FIG. 9 is schematic illustration of a first page or pane of a user interface, according to a possible embodiment.

FIG. 9 shows a possible embodiment of a page or panel of a user interface 900 allowing manual connections to peripheral devices using the software application module. The user interface includes a first section 910 where the received identification-related information associated to the wireless-power transmitter and/or the peripheral devices are displayed to the user. The first section 910 has a box 911 to display wireless-power transmitter identification and/or other information such as workstation or table identification. The first section also displays peripheral devices 912 associated to the wireless-power transmitter that may be received directly from the wireless-power transmitter or retrieved from the database. The peripheral devices may or may not be grouped by device type as shown in the figure. Drop-down menus or other ways of displaying information may be used to simplify user experience.

A second section 920 of the manual connection user interface is used to display or search other peripheral devices 922. The other peripheral devices may not be associated with current identification-related information received by the wireless-power transmitter. The other peripheral devices may be peripheral devices currently detected by the portable device and within reach for connection. The other peripheral device may also be a list of all peripheral devices within a working place/organization. Organization preferences may be applied to provide a custom experience depending on the size of the organization and their typical use case. Similarly to the first section 910, the peripheral devices may or may not be grouped by device type as shown in the figure. Drop-down menus or other ways of displaying information may be used to simplify user experience. A search field 921 may be used in the user interface to easily find a peripheral device to connect to. A list or drop-down menu may appear and update when the user types characters in the search bar. The user may also refresh the list or drop-down menu of the peripheral devices using a button 923.

A "Connect peripherals" button 930 allows for initiating a wireless connection to one or more peripheral devices selected in the first section 910 and/or second section 920. Peripheral devices may be selected by clicking on the corresponding boxes which may then change appearance to indicate to the user which peripheral devices are currently selected. For example, the user may click on monitor 14 which then becomes grayed out and click on the "Connect peripherals" button 930 to wirelessly connect to the monitor 14. If monitor 14 in within reach, available and powered, the connection should succeed allowing the user to start casting to it.

An "Update Database" button 940 may become ungrayed out, or enabled, when a peripheral device not associated with the identification-related information received is connected to the portable device. The user may then choose to update the database if desired by clicking on the button 940. In some embodiments, database updates may also be done automatically. Alternatively, or additionally, a request for updating the database may be sent to the user when a peripheral device is successfully connected manually but does not correspond with the information of the database. For example, a request for validation of the position of the wireless-power transmitter identified with the identification-related information received may be asked to the user, as the wireless-power transmitter may be associated to a specific physical position. If the user is currently located at another position, the position associated with the wireless-power transmitter may be updated in the database to the position given by the user. The position given by the user may also be compared with the position of the manually connected peripheral device in the database and updated as needed. The position validation request may also be presented when one or more of the identified peripheral devices are already connected with another portable device, allowing for validating which portable device has triggered a cross-communication and disconnect the portable device if needed.

Figure 10:
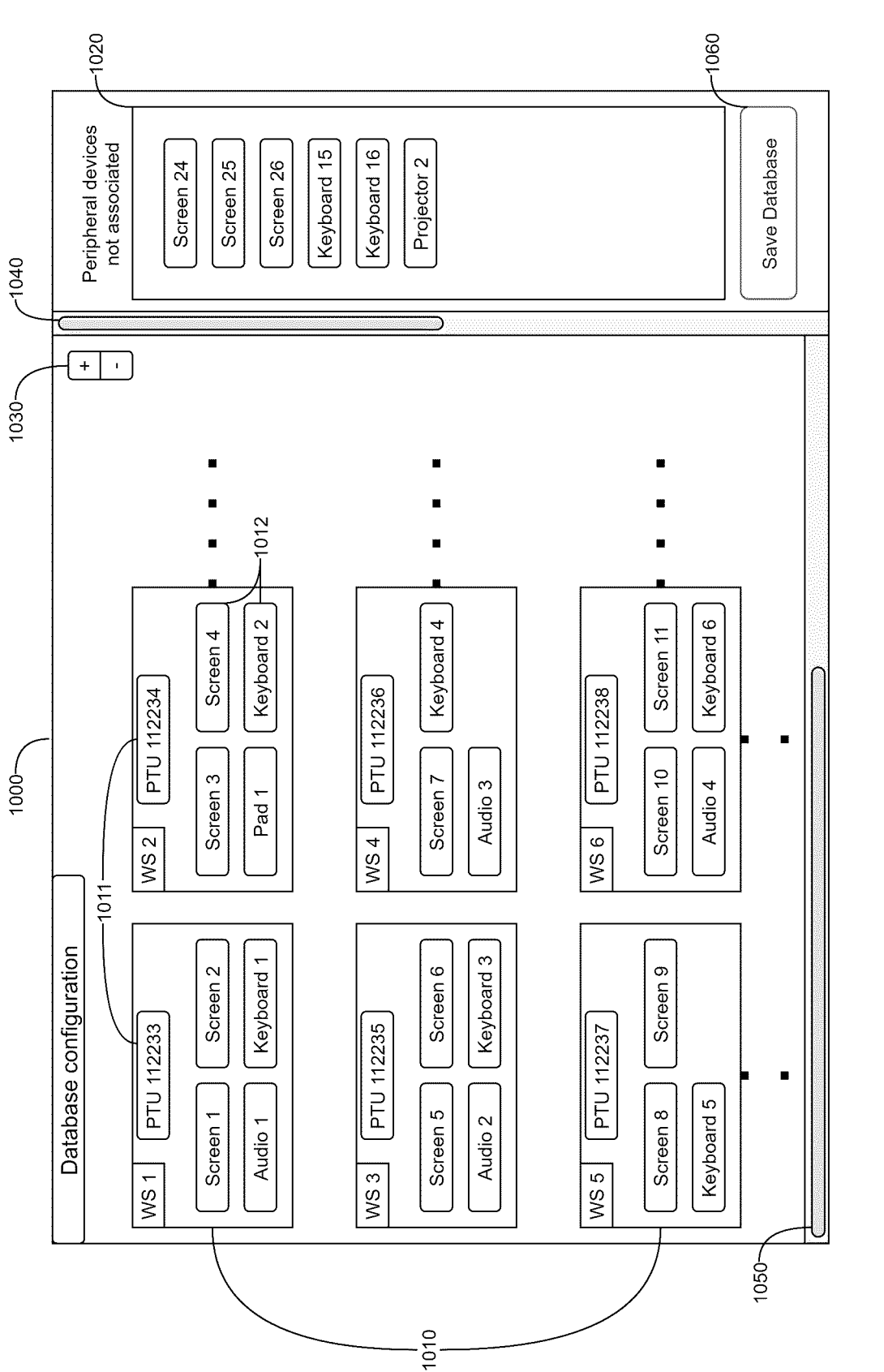
FIG. 10 is schematic illustration of another page or pane of a user interface, according to a possible embodiment.

FIG. 10 shows a possible embodiment of another page or panel 1000 of the user interface allowing database configuration. Using the page 1000, a user may associate one or more peripheral devices to one or more wireless-power transmitters, that may be located at a same workstation or table, for example. In FIG. 10, as an example, six different working station blocks 1010 and one or more associated wireless-power transmitters 1011 are displayed. A certain number of peripheral devices 1012 may also be associated with the workstation and thus with the one or more wireless-power transmitters.

The user can drag and drop wireless-power transmitters 1011 and peripheral devices 1012 from one workstation to another. The non-associated peripheral devices list 1020 is also available for dragging peripheral devices currently not associated to any workstation and associated them to a desired workstation.

Other features may be used to simplify visualization of the workstation such as a zoom bar 1030, vertical slider 1040 and horizontal slider 1050. In some embodiments, the workstation blocks 1010 may be placed in a way to represent the physical layout of an office or working place. The workstation block 1010 may also adjust in size in the user interface depending on the number of peripheral devices 1012 and wireless-power transmitter 1011 to display. Workstations may be places where people work, conference rooms or others, as examples.

A "Save Database" button 1060 may be used to manually update the database. The button may be grayed out when no changes were made since the last save and become ungrayed out, or enabled, when changes are made. The user may click on it to save the changes to the database.

Figure 11:
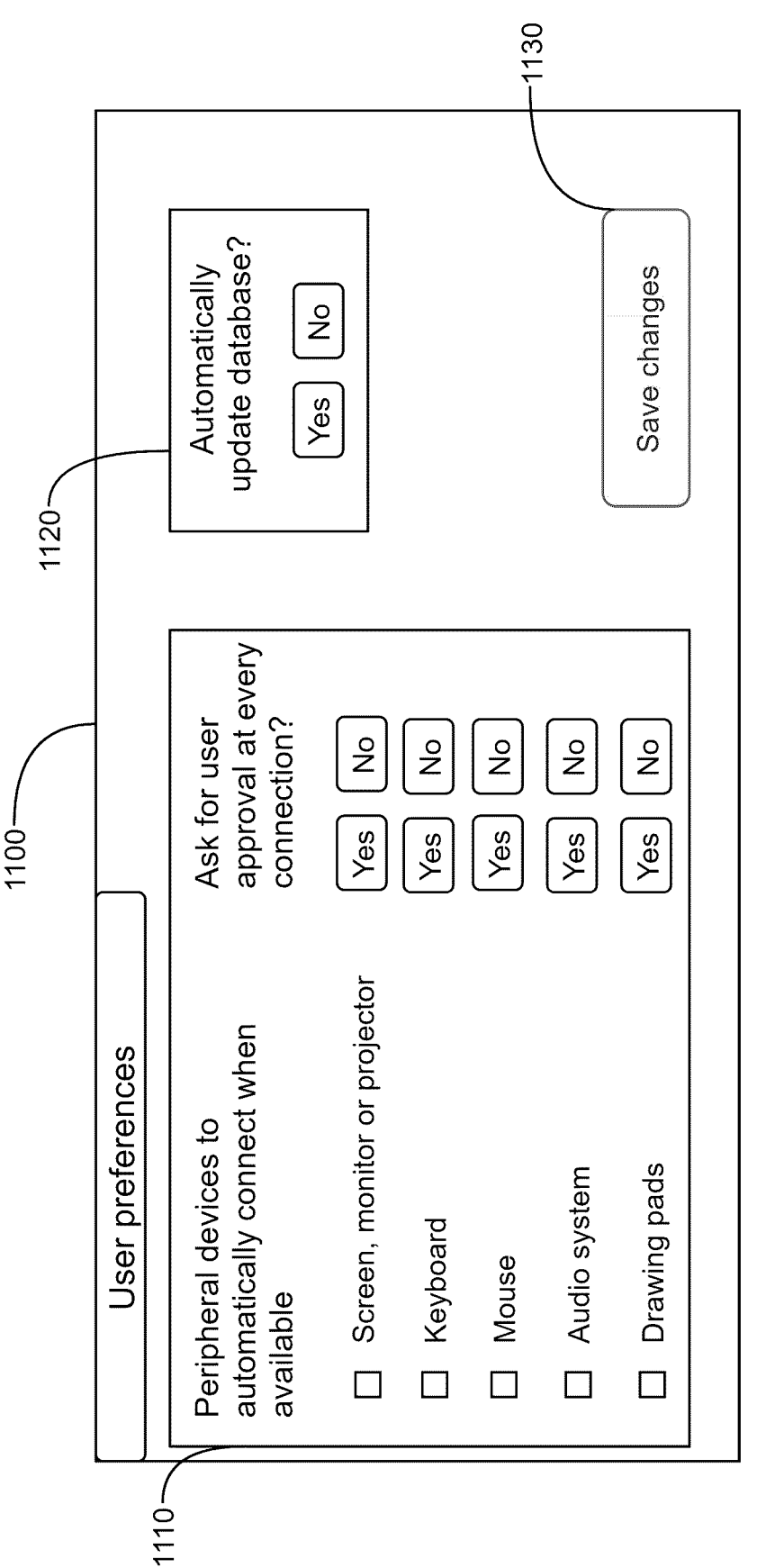
FIG. 11 is schematic illustration of yet another page or pane of a user interface, according to a possible embodiment.

FIG. 11 shows a possible embodiment of another page 1100 of the user interface where the user may define preferences. A first section 1110 has selection options on which types of devices the portable device may be automatically connected with when the necessary information is available. The list shown is an example only and other types of peripheral devices may be included. A checkbox for each type of device may be used. The user can check only the types of devices for which he wishes that an automatic connection is attempted and uncheck others. There further is a selection option for requiring the user's authorization every time a connection is to be established. The user can either click "Yes" or "No" buttons in the first section 1110 for each peripheral device type, and there may be an appearance change for the buttons clicked. For example, if a user checks "Screen, monitor or projector" and then selects "Yes" in the section "Ask for user approval at every connection?", the software application module will send a pop-up window to the user after receiving necessary information to connect to a screen. The software application module will then wait for the user to approve the connection using the pop-up window before sending instructions to the portable device controller to connect to the identified screen. If the user selects "No" instead, the software application module will directly and automatically send instructions for the connection and the portable device may start casting more rapidly to the screen without an intervention of the user.

User preferences also include an option selection, at section 1120, for the automatic updating of the database when a manual connection to a peripheral device not currently associated with the identification-related information received is executed. The appearance of the "Yes" and "No" buttons may change according to a selection.

Page 1100 of the user interface may further include other user preferences, such as selection options for opening or not the software application module every time the portable devices is booted, running or not the software application module in background and visual parameters. An organization, or company, for which multiple wireless-power transmitters are installed may also have a similar interface with organization preferences that would be apply to all workstations or wireless-power transmitters. For example, it may set the time to wait before disconnecting wireless connections between peripheral devices and a portable device when a wireless-power receiver exits a charging zone. Such preferences may also be proposed to the user depending on organization preferences.

A "Save changes" button 1130 is also available in the user interface. It may be grayed out until a new change is made and then allow the user to save the changes by clicking on the "Save changes" button.

Figure 12:
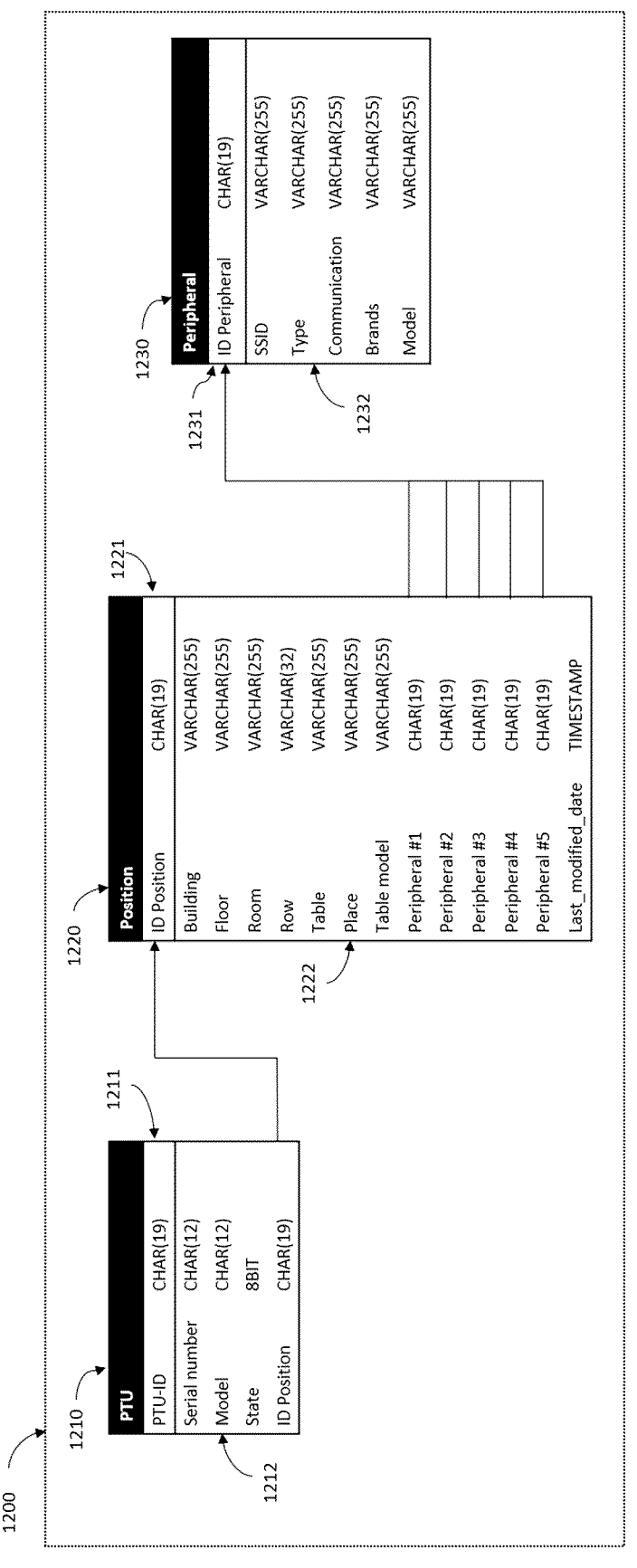
FIG. 12 is a database diagram showing possible entities containing additional information, according to a possible embodiment.

FIG. 12 shows an exemplary structure of a database containing the additional information needed to connect peripherals devices wirelessly to a portable device. The portion of the database 1200 shown may be included inside a larger database and may include further information such as the time of connection and disconnection or any other information needed for various embodiments. Those skilled in the art will understand that there are many ways to build a database to produce the same outcome, so this specific embodiment is non-limiting to the scope of the present application. Variable types are shown only as examples. The portion of the database 1200 shown includes three entities which are the wireless-power transmitter entity 1210, the position entity 1220 and the peripheral entity 1230. The wireless-power transmitter entity or PTU (power transfer unit) entity 1210 has a unique PTU identifier 1211. This unique identifier allows access to all PTU attributes 1212, for example the serial number of the wireless-power transmitter, its model, its state of charge or power delivery and a unique identification of the position of the PTU (ID Position). Other attributes may be included in this entity if needed.

The ID position identified from the PTU entity 1210 is the unique identifier 1221 of the position entity 1220. When retrieving this ID position unique identifier 1221, all the attributes of the position entity 1222 can also be retrieved. The Position attributes describe the physical location of the wireless-power transmitter in a given space, such as an open-space working environment. For example, the attributes describe the position of a docking station, a workstation, a desk, a table or a specific place in a meeting room, including the building, floor, room, row, table and place at the table. Other combinations of attributes may be provided in other embodiments. The attributes of the position entity 1222 may also include unique identifier for all the wireless peripheral devices that are located at this position.

The unique identifier for a peripheral device 1231 retrieved can be used to retrieve additional information on the peripheral device such as a device type and a communication protocol. The additional information can be found in the peripheral device entity 1230. The attributes of the peripheral entity 1232 may include the service set identifier (SSID) of the peripheral device or of a connected dongle giving the peripheral device wireless communication capabilities. This identifier is used when connecting the portable device and the wireless peripheral device. It may also be possible to use the SSID as the unique identifier of the peripheral device in some embodiments comprising further database entities. The attributes of the peripheral entity 1232 include the type of communication to use, such as Wi-Fi, Bluetooth, Miracast, Airplay, Wi-Fi direct or any other communication protocol needed. Another attribute may be the type of peripheral device, for example a wireless screen, a wireless keyboard, a wireless mouse, a wireless audio system or an external dongle such as a Chromecast or Miracast dongle. Other attributes may include the brand and the model of the wireless peripheral device or of the dongle connected to the peripheral device.

FIG. 12 further shows an exemplary embodiment of the process of retrieving additional information associated to the peripheral device starting from the identification-related information of the wireless-power transmitter, or its unique identifier (PTU-ID), and allowing to access the SSID and communication type for all peripheral devices located at the workstation associated to the wireless-power transmitter. When the identification-related information sent by the wireless-power transmitter to the wireless-power receiver is the peripheral identification, as described in reference to FIGS. 5A to 6B, the peripheral entity 1230 is directly used to retrieve the SSID, communication type and other needed information to create a wireless connection between the portable device and the peripheral device. However, when the identification-related information sent already includes the needed information, such as the SSID, the database may not even be necessary for attempting to connect to a peripheral device.

When a manual connection between a portable device and a peripheral device is performed by the user, it may be possible to update the database accordingly, as described hereinabove. In such a case, the list of peripheral is updated in the position entity 1220 of the portion of the database 1200. Alternatively, when a wireless-power transmitter is moved at another location, the attributes of the position entity 1210 related to the position of the wireless-power transmitter may be updated. When the peripheral devices are moved to a new position, the peripheral identification will be added to the unique position identifier 1221 in the position entity 1220 and erased from the old unique position identifier if it was already in the database.

The present application provides an advantage of using out-of-band communication, for example Bluetooth Low Energy, for wireless communication between wireless-power transmitters and wireless-power receivers, thus allowing for charging multiple devices simultaneously using a single wireless-power transmitter while allowing for communication between the wireless-power transmitters and receivers, conversely to in-band communication which only allows for communicating with one receiver at a time. Further, out-of-band communication avoids needing means for creating modulation on the power signal, thereby simplifying the design and various compliance certification processes.

Further, the simplicity of the present application avoids having to provide major updates to the wireless-power transmitters and receivers. Only the portable device needs to be updated or changed to work with new communication protocols, for example. This provides an advantage avoiding updates over-the-air for wireless-power transmitters and wireless-power receivers to be compatible with new communication protocols which can create some cybersecurity issues in a working space or require a lot of efforts to reinforce cybersecurity.

While the above description provides examples of the embodiments, it will be appreciated that some features and/or functions of the described embodiments are susceptible to modification without departing from the principles of the operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A wireless power transfer and docking station for wirelessly transferring power to a portable device and for communicating therewith, the station comprising:
   a wireless-power transmitter comprising:
      a wireless power transmission module having a power-transmitting antenna configured for wirelessly emitting a power signal,
      a transmitter communication module for wirelessly exchanging identification-related information allowing the portable device to establish a wireless connection with one or more peripheral devices associated with the wireless-power transmitter, and
      a transmitter-controller for controlling at least one of the wireless power transmission module and the transmitter communication module; and
   a wireless-power receiver comprising:
      a wireless power receiving module having a power-receiving antenna for receiving the power signal emitted from the wireless power transmission module and transferring the power from the power signal to the portable device,
      a receiver communication module for receiving the identification-related information from the transmitter communication module, and
      a receiver-controller for controlling at least one of the wireless power receiving module and the receiver communication module, the receiver-controller being further configured to communicate the identification-related information to the portable device;
   wherein the wireless-power transmitter is configured to send one or more power beacons, and
   wherein the wireless-power receiver is configured to broadcast one or more advertisement signals in response to detecting said one or more power beacons; and
   wherein the station is configured to pair the wireless-power transmitter with the wireless-power receiver based on the one or more broadcast advertisement signals from the wireless-power receiver to avoid cross-connection with adjacent wireless-power transmitters and cross-communication with adjacent peripheral devices.

2. The wireless power transfer and docking station according to claim 1, further comprising a software application module executed or accessed by the portable device and configured to perform automatic wireless connection between the portable device and the one or more peripheral devices based at least in part on the identification-related information.

3. The wireless power transfer and docking station of claim 2, wherein the software application module is further configured to perform the automatic wireless connection between the portable device and the one or more peripheral devices based on user preferences, the user preferences comprising at least allowed peripheral device types and automatic connection permissions.

4. The wireless power transfer and docking station of claim 2, wherein the software application module is further configured to automatically disconnect the portable device from the one or more peripheral devices upon detecting a disconnection event, the disconnection event including at least one of: the wireless-power receiver leaving a charging zone of the wireless-power transmitter, the wireless-power receiver leaving the charging zone for a given period of time, and a connection strength between the portable device and the one or more peripheral devices lowering below a strength threshold.

5. The wireless power transfer and docking station according to claim 2, further comprising a database storing additional information comprising at least one of wireless-power transmitter information, position information, and peripheral device information, and wherein the software application module is configured to retrieve the additional information from the database before automatically connecting the portable device to the one or more peripheral devices.

6. The wireless power transfer and docking station according to claim 5, wherein the software application module is further configured to automatically cast digital information from the portable device to a wireless monitor, when the portable device is automatically connected to the wireless monitor.

7. The wireless power transfer and docking station according to claim 5, wherein the power signal is modulated for transmitting the identification-related information.

8. The wireless power transfer and docking station according to claim 5, wherein:
   the wireless-power transmitter is a first wireless-power transmitter; and
   the wireless-power receiver is a first wireless-power receiver,
   the station further comprising:
   a second wireless-power transmitter; and
   a second wireless-power receiver operatively connected to the one or more peripheral devices for powering the one or more peripheral devices,
   the second wireless-power transmitter being wirelessly connectable to the second wireless-power receiver, and the identification-related information being exchanged between the second wireless-power receiver, the second wireless-power transmitter, the first wireless-power transmitter, and the first wireless-power receiver, allowing for automatically connecting the portable device to the one or more peripheral device, wherein the first and second wireless-power transmitters are connected together using a wired connection.

9. The wireless power transfer and docking station according to claim 5, wherein the software application module further comprises a user interface allowing for at least one of creating and/or updating the user preferences, manually updating the database, manually connecting the portable device with the one or more peripheral devices, confirming a connection between the portable device and a peripheral device, and disconnecting the one or more peripheral devices from the portable device.

10. The wireless power transfer and docking station according to claim 2, wherein the wireless-power receiver is a first wireless-power receiver, and wherein the station further comprises:

an additional wireless-power receiver operatively connected to the one or more peripheral devices, the wireless-power transmitter being simultaneously connectable to the first wireless-power receiver and to the additional wireless-power receiver, thereby powering the portable device and the one or more peripheral devices.

11. The wireless power transfer and docking station according to claim 1, wherein the wireless-power receiver is removably connected to the portable device using a single connector for transferring the power to the portable device and for exchanging the identification-related information with the portable device.

12. The wireless power transfer and docking station according to claim 11, wherein emission and reception of the power signal is performed using one of inductive coupling and resonant inductive coupling.

13. The wireless power transfer and docking station according to claim 1, wherein the wireless-power receiver is integrated to the portable device using internal electronic circuits.

14. A wireless power transfer and docking station for wirelessly transferring power to a portable device and communicating therewith, the station comprising:
a wireless-power transmitter comprising:
a wireless power transmission module configured to generate an alternating field to wirelessly transfer the power to the portable device located within a charging zone of the wireless-power transmitter, the wireless power transmission module comprising a power-transmitting antenna to generate the alternating field, the alternating field being a magnetic oscillating field;
a wireless communication module for transferring identification-related information allowing the portable device to establish a wireless connection with one or more peripheral devices, the one or more peripheral devices being external from both the wireless-power transmitter and the portable device; and
a transmitter-controller configured to control operating functions of the wireless-power transmitter, the operating functions comprising at least one of acquiring measurements related to signals of the wireless-power transmitter, controlling the input power conversion module, and controlling the wireless communication module.

15. A method for wirelessly transferring power to a portable device and for communicating therewith, allowing the portable device to wirelessly connect with one or more peripheral devices, the method comprising the steps of:
wirelessly pairing a wireless-power transmitter with a wireless-power receiver, the wireless-power receiver being connectable or integrated to the portable device, the wirelessly pairing comprising:
sending, from the wireless-power transmitter, power beacons to the wireless-power receiver, thereby activating the wireless-power receiver,
broadcasting, by the wireless-power receiver, an advertisement signal,
determining that at least one additional criterion is valid, the additional criterion comprising at least one of a timing criterion, an impedance criterion and physical characteristic data related to power and information transfer, and analyzing, by the wireless-power transmitter, the advertisement signal received, and determining that the advertisement signal corresponds to the wireless-power receiver;
wirelessly transferring power from the wireless-power transmitter to the wireless-power receiver, the power being used for charging and/or powering the portable device; and
wirelessly transferring identification-related information allowing the portable device to establish a wireless connection with the one or more peripheral devices.

16. The method according to claim 15, wherein the method further comprises monitoring steps for validating that the step of wirelessly pairing the wireless-power transmitter with the wireless-power receiver is successful, the monitoring steps comprising at least one of:
varying electric characteristics of the wireless-power transmitter, and monitoring corresponding variation of electric characteristics of the wireless-power receiver; and
comparing the power sent by the wireless-power transmitter and the power received by the wireless-power receiver.

17. The method according to claim 15, wherein wirelessly transferring the identification-related information comprises:
establishing a wireless communication channel between the wireless-power transmitter and the wireless-power receiver;
sending the identification-related information from the wireless-power transmitter to the wireless-power receiver;
sending the identification-related information from the wireless-power receiver to the portable device; and
identifying the one or more peripheral devices associated with the wireless-power transmitter based at least in part on the identification-related information.

18. The method according to claim 17, comprising notifying a user when an attempt at establishing a wireless connection between the portable device and at least one of the one or more peripheral devices fails.

19. The method according to claim 17, further comprising a step of communicating with a database configured for storing additional information necessary for identifying the one or more peripheral devices based on the identification-related information and for connecting with the one or more peripheral devices associated with the wireless-power transmitter, wherein the step of automatically attempting wirelessly connecting the portable device with the one or more peripheral devices is further based on the additional information stored in the database.

20. The method according to claim 17, further comprising a step of automatically disconnecting the portable device from the one or more peripheral devices in response to a disconnection event, the disconnection event including at least the wireless-power receiver leaving a charging zone of the wireless-power transmitter, the wireless-power receiver leaving the charging for a period of time, and a connection strength between the portable device and the one or more peripheral devices lowering below a strength threshold.

21. The method according to claim 15, further comprising wirelessly connecting an additional wireless-power receiver with the wireless-power transmitter, allowing for charging and communicating simultaneously with two wireless-power receivers.

* * * * *